US012131539B1

(12) United States Patent
Broaddus et al.

(10) Patent No.: US 12,131,539 B1
(45) Date of Patent: Oct. 29, 2024

(54) DETECTING INTERACTIONS FROM FEATURES DETERMINED FROM SEQUENCES OF IMAGES CAPTURED USING ONE OR MORE CAMERAS

(71) Applicant: Amazon Technologies, Inc., Seattle, WA (US)

(72) Inventors: Chris Broaddus, Sammamish, WA (US); Jayakrishnan Kumar Eledath, Princeton Junction, NJ (US); Tian Lan, Seattle, WA (US); Hui Liang, Issaquah, WA (US); Gerard Guy Medioni, Los Angeles, CA (US); Chuhang Zou, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,236

(22) Filed: Jun. 29, 2022

(51) Int. Cl.
*G06V 20/00* (2022.01)
*G06Q 30/0601* (2023.01)
(Continued)

(52) U.S. Cl.
CPC ......... *G06V 20/44* (2022.01); *G06Q 30/0643* (2013.01); *G06T 7/70* (2017.01);
(Continued)

(58) Field of Classification Search
CPC .... G06V 20/44; G06V 40/11; G06V 10/7715; G06V 20/46; G06V 10/82; G06V 20/41;
(Continued)

(56) References Cited

U.S. PATENT DOCUMENTS 6,154,559 A 11/2000 Beardsley
7,050,624 B2 5/2006 Dialameh et al.
(Continued)

FOREIGN PATENT DOCUMENTS

CN 104778690 B 6/2017
EP 1574986 B1 7/2008
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Daniel T Tekle
(74) *Attorney, Agent, or Firm* — Athorus, PLLC

(57) ABSTRACT

Cameras having storage fixtures within their fields of view are programmed to capture images and process clips of the images to generate sets of features representing product spaces and actors depicted within such images, and to classify the clips as depicting or not depicting a shopping event. Where consecutive clips are determined to depict a shopping event, features of such clips are combined into a sequence and transferred, along with classifications of the clips and a start time and end time of the shopping event, to a multi-camera system. A shopping hypothesis is generated based on such sequences of features received from cameras, along with information regarding items detected within the hands of such actors, to determine a summary of shopping activity by an actor, and to update a record of items associated with the actor accordingly.

21 Claims, 21 Drawing Sheets

(51) Int. Cl.
  *G06T 7/70*    (2017.01)
  *G06V 10/77*   (2022.01)
  *G06V 10/82*   (2022.01)
  *G06V 20/40*   (2022.01)
  *G06V 40/10*   (2022.01)
  *H04N 7/18*    (2006.01)

(52) U.S. Cl.
  CPC .......... *G06V 10/7715* (2022.01); *G06V 10/82* (2022.01); *G06V 20/41* (2022.01); *G06V 20/46* (2022.01); *G06V 40/11* (2022.01); *H04N 7/181* (2013.01); *G06T 2207/10016* (2013.01); *G06T 2207/10024* (2013.01); *G06T 2207/20081* (2013.01); *G06T 2207/20084* (2013.01); *G06T 2207/20132* (2013.01); *G06T 2207/30196* (2013.01); *G06T 2207/30242* (2013.01)

(58) Field of Classification Search
  CPC ............. G06T 7/70; G06T 2207/10016; G06T 2207/10024; G06T 2207/20081; G06T 2207/20084; G06T 2207/20132; G06T 2207/30196; G06T 2207/30242; G06Q 30/0643; H04N 7/181
  See application file for complete search history.

(56)  References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,863 B1 | 8/2011 | Sharma et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,577,705 B1 | 11/2013 | Baboo et al. | |
| 8,630,924 B2 | 1/2014 | Groenevelt et al. | |
| 8,688,598 B1 | 4/2014 | Shakes et al. | |
| 8,943,441 B1 | 1/2015 | Patrick et al. | |
| 9,158,974 B1 | 10/2015 | Laska et al. | |
| 9,160,979 B1 | 10/2015 | Ulmer | |
| 9,208,675 B2 | 12/2015 | Xu et al. | |
| 9,336,456 B2 | 5/2016 | Delean | |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1 | 12/2017 | Lin et al. | |
| 9,881,221 B2 | 1/2018 | Bala et al. | |
| 9,898,677 B1 | 2/2018 | Andjelković et al. | |
| 9,911,290 B1 | 3/2018 | Zalewski et al. | |
| 10,055,853 B1 | 8/2018 | Fisher et al. | |
| 10,133,933 B1 | 11/2018 | Fisher et al. | |
| 10,147,210 B1 | 12/2018 | Desai et al. | |
| 10,192,415 B2 | 1/2019 | Heitz et al. | |
| 10,354,262 B1 | 7/2019 | Hershey et al. | |
| 10,474,992 B2 | 11/2019 | Fisher et al. | |
| 10,510,219 B1 | 12/2019 | Zalewski et al. | |
| 10,535,146 B1 | 1/2020 | Buibas et al. | |
| 10,635,844 B1 | 4/2020 | Roose et al. | |
| 10,839,203 B1 | 11/2020 | Guigues et al. | |
| 11,030,442 B1 | 6/2021 | Bergamo et al. | |
| 11,195,146 B2 | 12/2021 | Fisher et al. | |
| 11,232,294 B1 | 1/2022 | Banerjee et al. | |
| 11,270,260 B2 | 3/2022 | Fisher et al. | |
| 11,284,041 B1 | 3/2022 | Bergamo et al. | |
| 11,367,083 B1 | 6/2022 | Saurabh et al. | |
| 11,468,698 B1 | 10/2022 | Kim et al. | |
| 11,482,045 B1 | 10/2022 | Kim et al. | |
| 11,538,186 B2 | 12/2022 | Fisher et al. | |
| 11,734,949 B1* | 8/2023 | Kviatkovsky | G06V 40/107 382/181 |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2005/0251347 A1 | 11/2005 | Perona et al. | |
| 2006/0018516 A1 | 1/2006 | Masoud et al. | |
| 2006/0061583 A1 | 3/2006 | Spooner et al. | |
| 2006/0222206 A1 | 10/2006 | Garoutte | |
| 2007/0092133 A1 | 4/2007 | Luo | |
| 2007/0156625 A1 | 7/2007 | Visel | |
| 2007/0182818 A1 | 8/2007 | Buehler | |
| 2007/0242066 A1 | 10/2007 | Rosenthal | |
| 2007/0276776 A1 | 11/2007 | Sagher et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0159634 A1 | 7/2008 | Sharma et al. | |
| 2008/0166019 A1 | 7/2008 | Lee | |
| 2008/0193010 A1 | 8/2008 | Eaton et al. | |
| 2008/0195315 A1 | 8/2008 | Hu et al. | |
| 2009/0060352 A1 | 3/2009 | Distante et al. | |
| 2009/0083815 A1 | 3/2009 | McMaster et al. | |
| 2009/0121017 A1 | 5/2009 | Cato et al. | |
| 2009/0132371 A1 | 5/2009 | Strietzel et al. | |
| 2009/0210367 A1 | 8/2009 | Armstrong et al. | |
| 2009/0245573 A1 | 10/2009 | Saptharishi et al. | |
| 2009/0276705 A1 | 11/2009 | Ozdemir et al. | |
| 2010/0002082 A1 | 1/2010 | Buehler et al. | |
| 2010/0033574 A1 | 2/2010 | Ran et al. | |
| 2011/0011936 A1 | 1/2011 | Morandi et al. | |
| 2011/0205022 A1 | 8/2011 | Cavallaro et al. | |
| 2012/0106800 A1* | 5/2012 | Khan | G06V 20/182 382/104 |
| 2012/0148103 A1 | 6/2012 | Hampel et al. | |
| 2012/0159290 A1 | 6/2012 | Pulsipher et al. | |
| 2012/0257789 A1 | 10/2012 | Lee et al. | |
| 2012/0284132 A1 | 11/2012 | Kim et al. | |
| 2012/0327220 A1 | 12/2012 | Ma | |
| 2013/0076898 A1 | 3/2013 | Philippe et al. | |
| 2013/0095961 A1 | 4/2013 | Marty et al. | |
| 2013/0156260 A1 | 6/2013 | Craig | |
| 2013/0253700 A1 | 9/2013 | Carson et al. | |
| 2013/0322767 A1 | 12/2013 | Chao et al. | |
| 2014/0139633 A1 | 5/2014 | Wang et al. | |
| 2014/0139655 A1 | 5/2014 | Mimar | |
| 2014/0259056 A1 | 9/2014 | Grusd | |
| 2014/0279294 A1 | 9/2014 | Field-Darragh et al. | |
| 2014/0282162 A1 | 9/2014 | Fein et al. | |
| 2014/0334675 A1 | 11/2014 | Chu et al. | |
| 2014/0362195 A1 | 12/2014 | Ng-Thow-Hing et al. | |
| 2014/0362223 A1 | 12/2014 | LaCroix et al. | |
| 2014/0379296 A1 | 12/2014 | Nathan et al. | |
| 2015/0019391 A1 | 1/2015 | Kumar et al. | |
| 2015/0039458 A1 | 2/2015 | Reid | |
| 2015/0073907 A1 | 3/2015 | Purves et al. | |
| 2015/0131851 A1 | 5/2015 | Bernal et al. | |
| 2015/0199824 A1 | 7/2015 | Kim et al. | |
| 2015/0206188 A1 | 7/2015 | Tanigawa et al. | |
| 2015/0262116 A1 | 9/2015 | Katircioglu et al. | |
| 2015/0269143 A1 | 9/2015 | Park et al. | |
| 2015/0294483 A1 | 10/2015 | Wells et al. | |
| 2016/0003636 A1 | 1/2016 | Ng-Thow-Hing et al. | |
| 2016/0012465 A1* | 1/2016 | Sharp | G06Q 20/321 705/14.17 |
| 2016/0059412 A1* | 3/2016 | Oleynik | G05B 19/42 700/250 |
| 2016/0125245 A1 | 5/2016 | Saitwal et al. | |
| 2016/0127641 A1 | 5/2016 | Gove | |
| 2016/0292881 A1 | 10/2016 | Bose et al. | |
| 2016/0307335 A1 | 10/2016 | Perry et al. | |
| 2017/0116473 A1 | 4/2017 | Sashida et al. | |
| 2017/0206669 A1 | 7/2017 | Saleemi et al. | |
| 2017/0262994 A1 | 9/2017 | Kudriashov et al. | |

(56) References Cited

U.S. PATENT DOCUMENTS

| | | | |
|---|---|---|---|
| 2017/0278255 A1 | 9/2017 | Shingu et al. | |
| 2017/0309136 A1 | 10/2017 | Schoner | |
| 2017/0323376 A1 | 11/2017 | Glaser et al. | |
| 2017/0345165 A1 | 11/2017 | Stanhill et al. | |
| 2017/0352234 A1* | 12/2017 | Al Awaysheh | H04W 12/126 |
| 2017/0353661 A1 | 12/2017 | Kawamura | |
| 2018/0025175 A1 | 1/2018 | Kato | |
| 2018/0070056 A1 | 3/2018 | DeAngelis et al. | |
| 2018/0084242 A1 | 3/2018 | Rublee et al. | |
| 2018/0164103 A1 | 6/2018 | Hill | |
| 2018/0165728 A1 | 6/2018 | McDonald et al. | |
| 2018/0218515 A1 | 8/2018 | Terekhov et al. | |
| 2018/0315329 A1 | 11/2018 | D'Amato et al. | |
| 2018/0343442 A1 | 11/2018 | Yoshikawa et al. | |
| 2019/0043003 A1 | 2/2019 | Fisher et al. | |
| 2019/0073627 A1 | 3/2019 | Nakdimon et al. | |
| 2019/0102044 A1 | 4/2019 | Wang et al. | |
| 2019/0156274 A1 | 5/2019 | Fisher et al. | |
| 2019/0156277 A1 | 5/2019 | Fisher et al. | |
| 2019/0158801 A1 | 5/2019 | Matsubayashi | |
| 2019/0236531 A1 | 8/2019 | Adato et al. | |
| 2019/0315329 A1 | 10/2019 | Adamski et al. | |
| 2020/0005490 A1 | 1/2020 | Paik et al. | |
| 2020/0043086 A1 | 2/2020 | Sorensen | |
| 2020/0090484 A1 | 3/2020 | Chen et al. | |
| 2020/0134701 A1* | 4/2020 | Zucker | H04N 7/181 |
| 2020/0279382 A1 | 9/2020 | Zhang et al. | |
| 2020/0320287 A1 | 10/2020 | Porikli et al. | |
| 2020/0381111 A1 | 12/2020 | Huang et al. | |
| 2021/0019914 A1 | 1/2021 | Lipchin et al. | |
| 2021/0027485 A1 | 1/2021 | Zhang | |
| 2021/0124936 A1 | 4/2021 | Mirza et al. | |
| 2021/0182922 A1 | 6/2021 | Zheng et al. | |
| 2021/0287013 A1* | 9/2021 | Carter | G06F 18/21 |
| 2022/0028230 A1* | 1/2022 | Srinivasan | H04N 21/4131 |
| 2022/0101007 A1* | 3/2022 | Kadav | G06V 10/82 |

FOREIGN PATENT DOCUMENTS

| | | |
|---|---|---|
| JP | 2013196199 A | 9/2013 |
| JP | 201489626 A | 5/2014 |
| JP | 2018207336 A | 12/2018 |
| JP | 2019018743 A | 2/2019 |
| JP | 2019096996 A | 6/2019 |
| KR | 20170006097 A | 1/2017 |
| WO | 0021021 A1 | 4/2000 |
| WO | 02059836 A2 | 8/2002 |
| WO | 2017151241 A2 | 9/2017 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Fuentes et al., "People tracking in surveillance applications," Proceedings 2nd IEEE Int. Workshop on PETS, Kauai, Hawaii, USA, Dec. 9, 2001, 6 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

Harville, M., "Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

He, K., et al., "Identity Mappings in Deep Residual Networks," ECCV 2016 Camera-Ready, URL: https://arxiv.org/pdf/1603.05027.pdf, Jul. 25, 2016, 15 pages.

Huang, K. S. et al. "Driver's View and Vehicle Surround Estimation Using Omnidirectional Video Stream," IEEE IV2003 Intelligent Vehicles Symposium. Proceedings (Cal. No.03TH8683), Jun. 9-11, 2003, http://cvrr.ucsd.edu/VOW2/papers/IV03DrView_Final_Header.pdf, pp. 444-449.

Lee, K. and Kacorri, H., (2019, May), "Hands Holding Clues for Object Recognition in Teachable Machines", In Proceedings of the 2019 CHI Conference on Human Factors in Computing Systems (pp. 1-12).

Liu, C., et al. "Accelerating Vanishing Point-Based Line Sampling Scheme for Real-Time People Localization", IEEE Transactions on Circuits and Systems for Video Technology. vol. 27. No. 3 Mar. 2017 (Year: 2017).

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOLO9000: Better, Faster, Stronger," URL: https://arxiv.org/pdf/1612.08242.pdf, Dec. 25, 2016, 9 pages.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download;jsessionid=463D09F419FA5595DBF9DEF30D7EC663?doi=10.1.1.331.6672&rep=rep1&type=pdf, 5 pages.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Dec. 2, 1998, Microsoft Research, Microsoft Corporation, URL: https://www.microsoft.com/en-us/research/wp-content/uploads/2016/02/tr98-71.pdf, 22 pages.

* cited by examiner

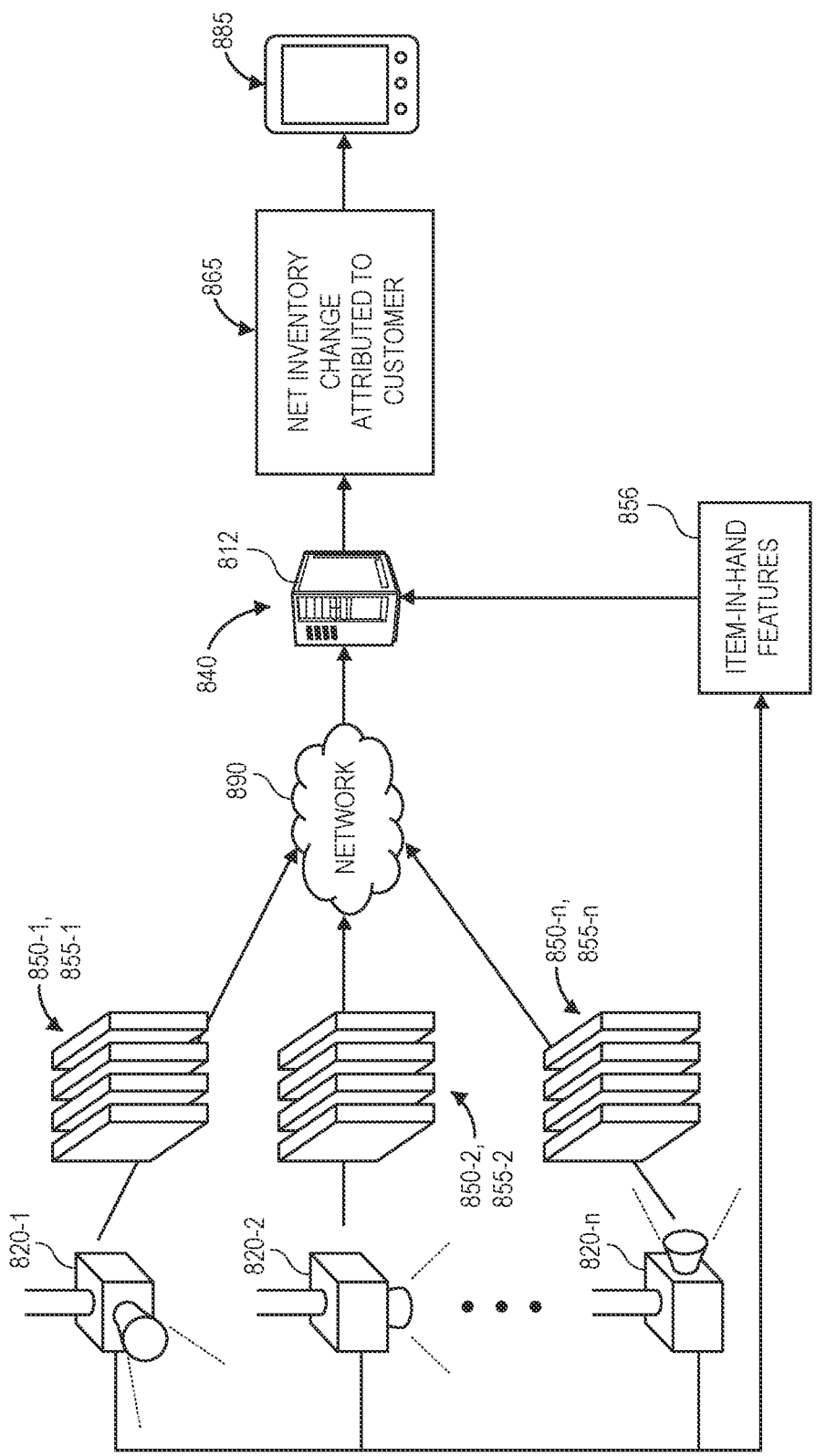

DETECTING INTERACTIONS FROM FEATURES DETERMINED FROM SEQUENCES OF IMAGES CAPTURED USING ONE OR MORE CAMERAS

BACKGROUND

Today, imaging devices are used in a wide number of applications for detecting and locating objects, such as actors, that are depicted within imaging data. For example, cameras are often used to monitor arrivals or departures of goods or performances of services in materials handling facilities such as warehouses, fulfillment centers, retail establishments or other like facilities, or to monitor travels of persons or objects in locations such as airports, stadiums or other dense environments, or on one or more sidewalks, roadways or highways. Cameras are also frequently installed and used in financial settings such as banks or casinos, where money changes hands in large amounts, at high rates of speed, or between large numbers of people.

In dynamic environments such as materials handling facilities, transportation centers, financial institutions or like facilities, it is frequently difficult to detect and locate large numbers of objects or actors using cameras. Many systems for detecting and locating objects or actors in three-dimensional (or "3D") space rely on large numbers of individual cameras to capture imaging data (e.g., visual images of an object, or depth images or other samples of depths or ranges to the object), and to provide the captured imaging data to servers or other centralized systems.

Determining whether an actor has executed a given event, e.g., a shopping event such as a taking of an object from a storage unit, a return of an object to the storage unit, or an event that involves neither a taking nor a return of an object, based on imaging data captured from large numbers of digital cameras may be a computationally expensive process that tends to consume or occupy substantial amounts of available data storage, processing and transmission capacities, and may require comparatively lengthy processing times.

BRIEF DESCRIPTION OF THE DRAWINGS

FIGS. 1A through 1L are views of aspects of one system for detecting events in accordance with implementations of the present disclosure.

FIG. 8 is a view of aspects of one system for detecting events in accordance with implementations of the present disclosure.

DETAILED DESCRIPTION

As is set forth in greater detail below, the present disclosure is directed to systems and methods for detecting events from image features that are generated from sequences of images captured using one or more cameras or other imaging devices. More specifically, one or more implementations of the present disclosure are directed to networks of cameras or other imaging devices that are programmed or configured to capture images of one or more fixtures having product spaces or other locations for accommodating items. In some implementations, the images may be cropped and masked, layered or stacked to indicate segments depicting hands, products within such hands, or product spaces depicted therein, or to exclude any background or other features therefrom, and processed to determine positions of body parts in 3D space.

Whether an interaction with one or more of the items has occurred may be determined by processing such images to determine features regarding the product spaces, and interpreting the features to predict whether a shopping event (e.g., a taking or picking event, a return or deposit event, or no event) involving one or more of the items has occurred, or how many of such events have occurred. In some implementations, the features may be processed using one or more transformers or other machine learning models (or algorithms, systems or techniques) that may be trained to receive sets of images streamed from one or more cameras and generate a hypothesis as to a number of shopping events performed by an actor in a single forward pass, or a net change in inventory based on such events.

Figure 1A:
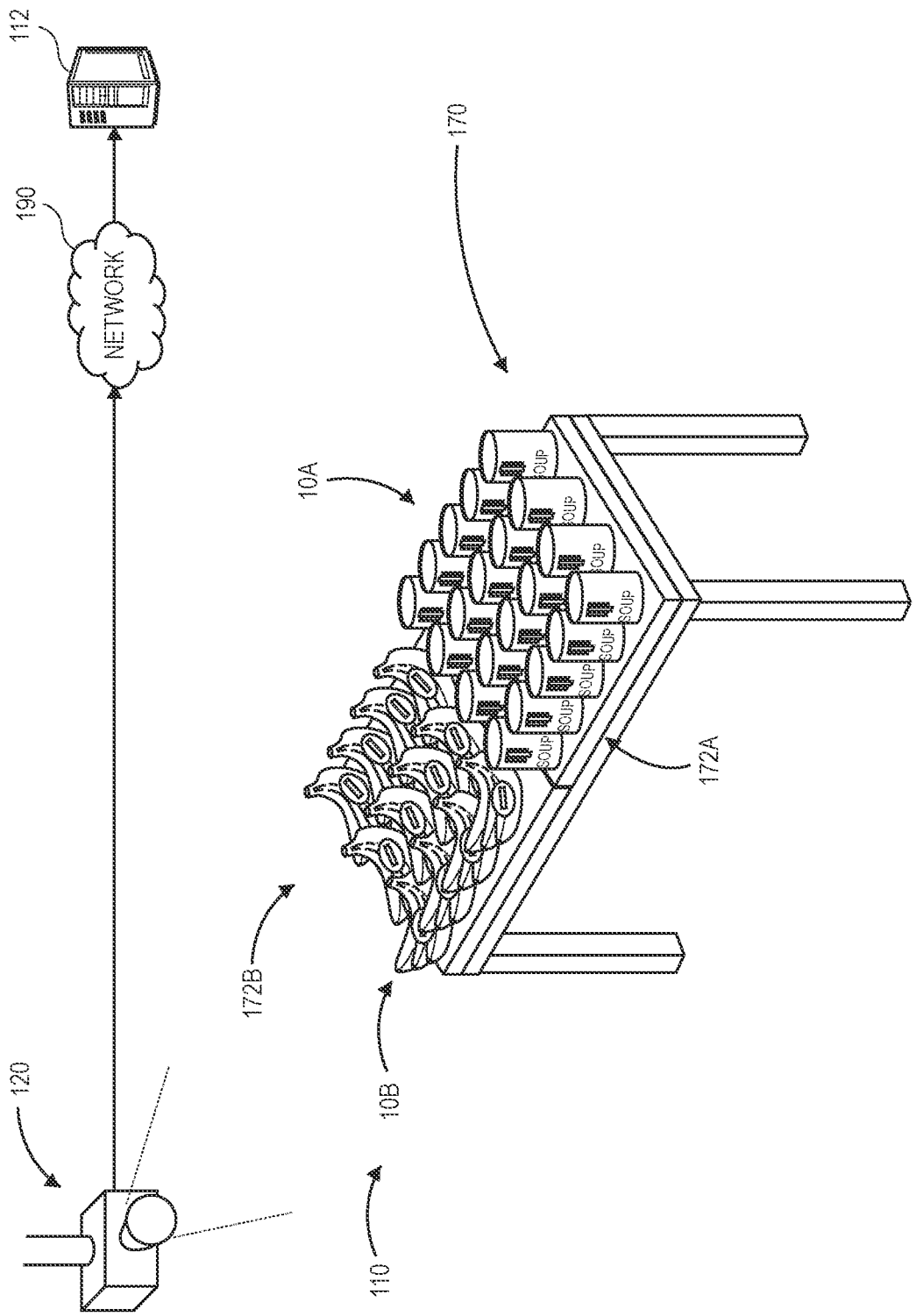

Referring to FIGS. 1A through 1L, views of aspects of one system for detecting events in accordance with implementations of the present disclosure are shown. As is shown in FIG. 1A, a scene 110 such as a materials handling facility, a fulfillment center, a warehouse, or any other like facility includes a camera 120 and a fixture 170 (e.g., a table, a rack or a set of inventory shelves). The camera 120 may be connected to a system 112 (e.g., a server) or any other devices, systems or components (not shown) over a network 190, or one or more networks, which may include the Internet in whole or in part. The system 112 may be provided in the same physical location as the scene 110, or in one or more alternate or virtual locations, e.g., in a "cloud"-based environment.

The scene 110 may be any open or enclosed environment or space in which any number of actors (e.g., customers, workers or other humans, animals or machines) may execute one or more poses, gestures, movements or other interactions within the field of view of the camera 120. The fixture 170 includes a plurality of product spaces (e.g., sections or areas having one or more surfaces for accommodating items) 172A, 172B. As is further shown in FIG. 1A, the product spaces 172A, 172B are portions (e.g., lanes or other predefined sections) of a common platform of the fixture 170, which may be a table or any other fixture. Alternatively, or additionally, either or both of the product spaces 172A, 172B or any other product spaces (not shown) may occupy a portion or an entirety of the fixture 170.

Each of the product spaces 172A, 172B includes a set of items 10A, 10B thereon. For example, the set of items 10A includes cans of soup or other food products, while the set of items 10B includes bunches of bananas or other fruits or produce. Alternatively, or additionally, the product spaces 172A, 172B may include items of any other type or form.

The camera 120 may include any number of lenses, memory or storage components, photosensitive surfaces, filters, chips, electrodes, clocks, boards, timers, power sources, connectors or any other components. In some implementations, the camera 120 may have a field of view that overlaps with another field of view of another camera (not shown), at least in part, and may be aligned in different locations and at a non-parallel angle or orientation with respect to that camera. In some implementations, the camera 120 may be calibrated, and operated along with one or more other cameras, such that mappings between coordinates of imaging data captured by the respective cameras and directions relative to their respective image sensors are known. Additionally, the camera 120 may be installed or otherwise operated independently or as components of an imaging device network (or camera network). For example, the camera 120 may be in communication with one or more other devices or systems, e.g., over the network 190. Such other devices or systems may include one or more databases or other data stores having information regarding attributes that are, have been or might be stored on the fixture 170, e.g., the sets of items 10A, 10B, and their respective locations, e.g., the product spaces 172A, 172B. In some implementations, the attributes may include, but need not be limited to, dimensions and/or masses of the items 10A, 10B, locations on the fixture 170 or the product spaces 172A, 172B where the items 10A, 10B are typically placed, colors or textures of surface elements (e.g., packaging, wrapping, coverings or the like) of the items 10A, 10B, or any other attributes.

The camera 120 may be configured to capture visual images (e.g., color, grayscale, or black-and-white images), or any other type or form of imaging data (e.g., depth images). In some implementations, the camera 120 may include one or more sensors that are configured to capture visual imaging data at relatively high levels of resolution, any number of pixels (e.g., eight to nine megapixels) per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light scattered or reflected from objects and assign one or more quantitative values (e.g., red, green, blue or other color values, or distances or ranges to such objects) to aspects of the scattered or reflected light. Alternatively, or additionally, in some implementations, the camera 120 may be configured to capture any other imaging data, such as depth imaging data, or visual imaging data at any levels of resolution or frame rates.

In some implementations, the camera 120 may be self-powered, e.g., by one or more power sources internal to or onboard the camera 120, such as batteries or fuel cells. In some other implementations, however, the camera 120 may receive alternating current (or AC) or direct current (or DC) power from one or more external power sources, e.g., by one or more conductors or other connectors. For example, the camera 120 may receive power by a dedicated connection to external devices or systems, or power sources, e.g., according to a Power over Ethernet (or "PoE") or a Universal Serial Bus Type-C ("USB-C") standard or system that may also be utilized to transfer information or data to or from the camera 120.

Figure 1B:
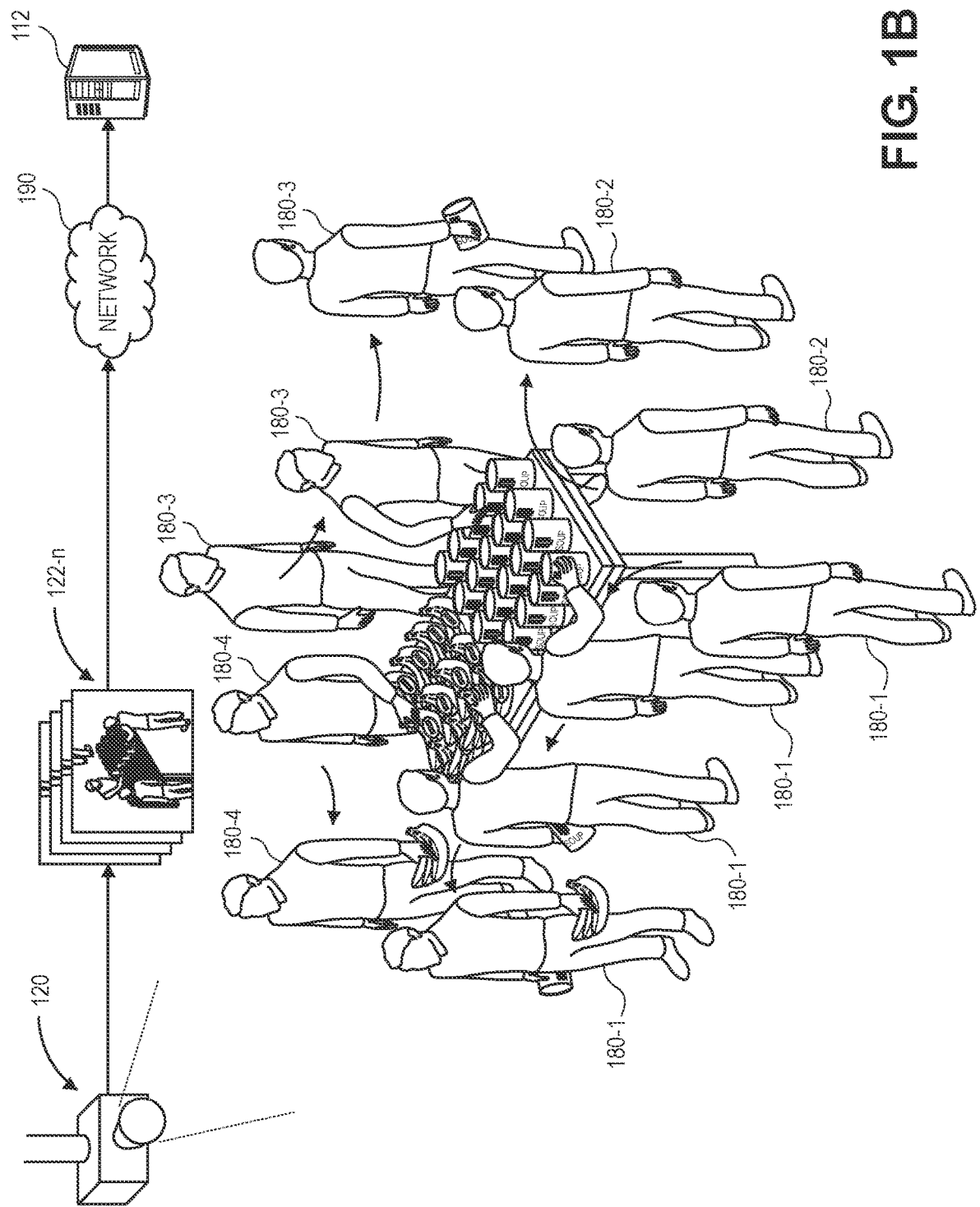

As is shown in FIG. 1B, a plurality of actors 180-1, 180-2, 180-3, 180-4 (e.g., customers, workers or other humans) execute one or more poses, gestures or other actions within a vicinity of the fixture 170, and within a field of view of the camera 120. For example, as is shown in FIG. 1B, one or more of the actors 180-1, 180-2, 180-3, 180-4 may independently walk around the fixture 170, extend one or more hands over the fixture 170 or the product spaces 172A, 172B, retrieve and manipulate one or more of the items 10A, 10B, manually and visually evaluate one or more of the items 10A, 10B, place one or more of the items 10A, 10B into a basket, a cart, a pocket or another enclosure or receptacle, or return any of the items 10A, 10B to the product spaces 172A, 172B, or place any other items (not shown) onto one or both of the product spaces 172A, 172B. Alternatively, or additionally, the actors 180-1, 180-2, 180-3, 180-4 may execute any other movements or actions within a vicinity of the fixture 170. The camera 120 may capture images 122-*n* at any rate, e.g., fifteen frames per second (fps), or any other frame rate, as the actors 180-1, 180-2, 180-3, 180-4 execute one or more poses, gestures or other actions.

Figure 1C:
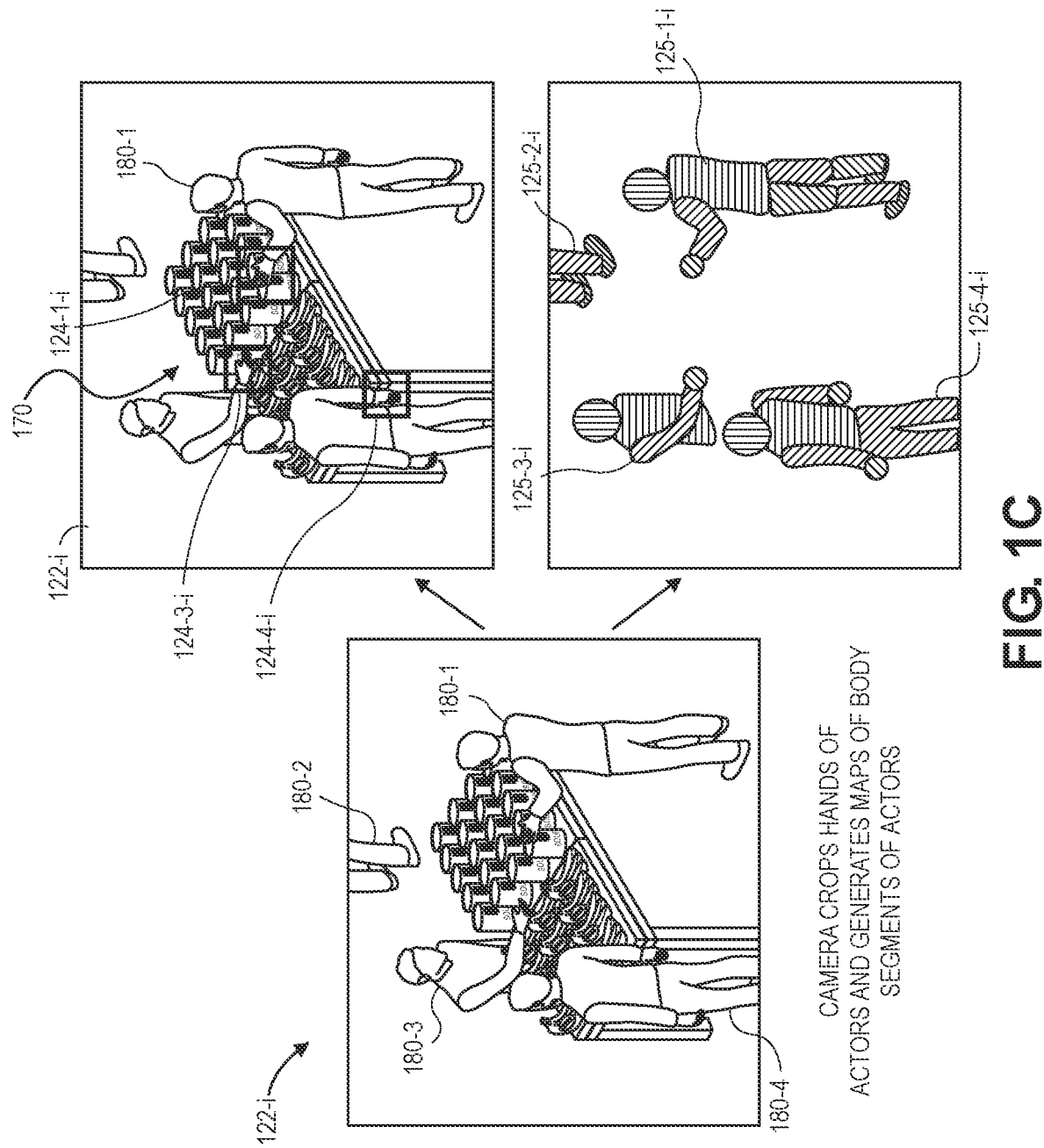

The images 122-*n* captured by the camera 120 may be processed to detect body parts of any number of actors depicted therein, and to predict whether any of such actors executed shopping events, e.g., taking or picking events, returning or depositing events, or no events at all, based on such images. As is shown in FIG. 1C, a representative image 122-*i* may be any of the images 122-*n* captured by the camera 120 at a constant frame rate. For example, as the actor 180-1 executes poses, gestures or other actions, the camera 120 may capture and process the image 122-*i* to determine whether the image 122-*i* depicts any body parts such as heads, arms, hands, torsos or portions thereof within any of such images 122-1 . . . 122-*n*. In some implementations, the camera 120 may be configured to execute a body part detection module (e.g., an algorithm, system or technique), which may be an artificial neural network, such as a convolutional neural network, or any other machine learning model, such as a segmentation network, that is trained to identify such body parts depicted within an image. In some implementations, a body part detection module may generate a segmentation record identifying segments of an image depicting body parts and their respective locations within the image. In some implementations, a body part detection module may be configured to detect portions of a body part, including but not limited to multiple portions of the same body part, e.g., an upper arm and a lower arm.

In some implementations, the camera 120 may further process the image 122-*i* to identify segments of the image 122-*i* corresponding to body parts (including but not limited to hands) of the actor 180-1. For example, the image 122-*i* may be processed to detect hands of any of the actors 180-1, 180-2, 180-3, 180-4 depicted within the image 122-*i*, to identify portions 124-1-*i*, 124-2-*i*, 124-3-*i*, 124-4-*i* of the image 122-*i* depicting such hands. The cropped portions 124-1-*i*, 124-2-*i*, 124-3-*i*, 124-4-*i* may be subsequently processed to determine whether any of such portions 124-1-*i*, 124-2-*i*, 124-3-*i*, 124-4-*i* depicts any items therein, or to identify any of such items.

Upon detecting segments of such images 122-*i* depicting body parts, the camera 120 may identify one or more attributes of such segments, e.g., by image segmentation, image filtering, image smoothing and/or image localization, and determine and store attributes of such sets of pixels, or the sets of pixels themselves, in one or more data stores. The camera 120 may further associate two or more of the body parts detected within the image 122-*i* with one another. For example, the camera 120 may generate vectors of regression identifying pairs of body parts that are associated with one another, and assign probabilities that the pairs of body parts belong to a common actor, e.g., based on any number of physiological parameters or constraints, as well as any metrics of compatibility or incompatibility.

Additionally, where hands or other body parts, or items within such hands, are detected within the image 122-$i$, such hands or items may be tracked from image to image, and positions of the hands or items (or other body parts) in 3D space may be determined based on the images 122-$i$. In some implementations, the image 122-$i$ may be further processed to generate maps 125-1-$i$, 125-2-$i$, 125-3-$i$, 125-4-$i$ of segments of the image 122-$i$ representing body parts (e.g., body segments), which may but need not include hands. Once locations of the body parts are depicted within the image 122-$i$, the image 122-$i$ may be stacked, annotated or otherwise augmented to include one or more layers or other information, data or metadata labeling or referencing locations of such body parts, or identifying any of such body parts depicted therein. The camera 120 may be programmed or configured to represent body parts of actors, or associations between such body parts, in any manner in accordance with implementations of the present disclosure. For example, the camera 120 may represent body parts in the form of a map, such as the maps 125-1-$i$, 125-2-$i$, 125-3-$i$, 125-4-$i$ shown in FIG. 1C, as well as a skeleton or any other representation, e.g., a parametric representation, which may be expressed within a two-dimensional image plane, or in 3D space, or according to any other standard. Likewise, although FIG. 1C shows that four maps 125-1-$i$, 125-2-$i$, 125-3-$i$, 125-4-$i$ are generated based on segments depicting body parts of the actors 180-1, 180-2, 180-3, 180-4 any number of maps may be generated based on segments of body parts of any number of actors depicted therein. Such maps 125-1-$i$, 125-2-$i$, 125-3-$i$, 125-4-$i$ may be represented in the same set of data or data structure, or independently in different sets of data or data structures, in accordance with implementations of the present disclosure.

Figure 1D:
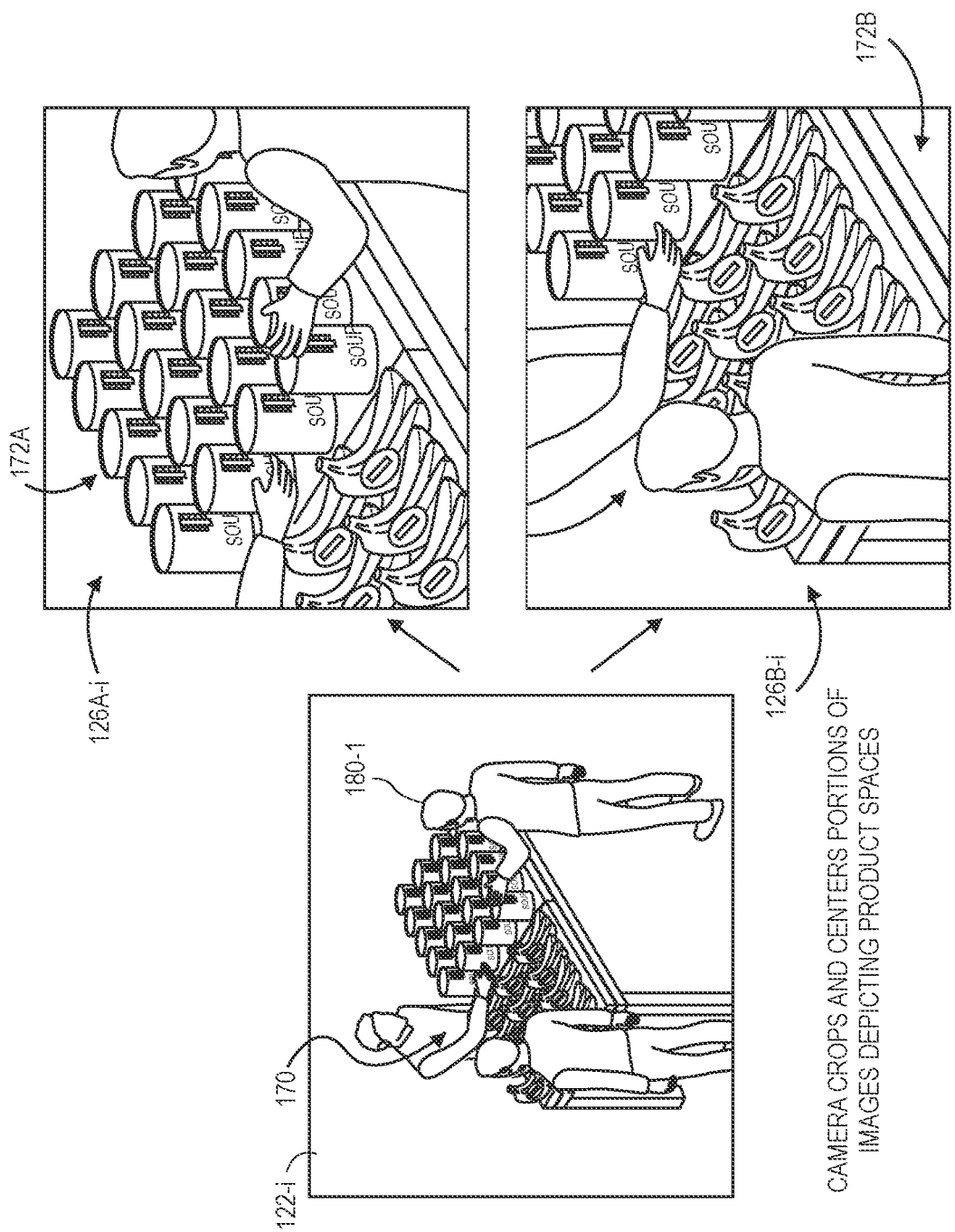

As is shown in FIG. 1D, the image 122-$i$ may be further processed, e.g., by cropping or masking, to generate images 126A-i, 126B-i that include only portions of the image 122-$i$ depicting the respective product spaces 172A, 172B, respectively, as well as any overlapping body parts, items or other objects. The images 126A-i, 126B-i may be centered on centers or centroids of the product spaces 172A, 172B, or otherwise oriented to prioritize the product spaces 172A, 172B within such images 126A-i, 126B-i.

Although the image 122-$i$ is cropped into the portions 126A-i, 126B-i, to depict the two product spaces 172A, 172B of the fixture 170, those of ordinary skill in the pertinent arts will recognize that any images captured by the camera 120 may be processed or otherwise modified to include any number of product spaces. Moreover, the image 122-$i$ may be cropped in any number of instances, including at least once for each product depicted therein, at least one for each actor (e.g., the actors 180-1, 180-2, 180-3, 180-4) or body parts thereof, or at least once for each of the product spaces depicted therein. Alternatively, the image 122-$i$ need not be cropped or masked at all, and may be processed in its entirety, in accordance with some implementations of the present disclosure.

Figure 1E:
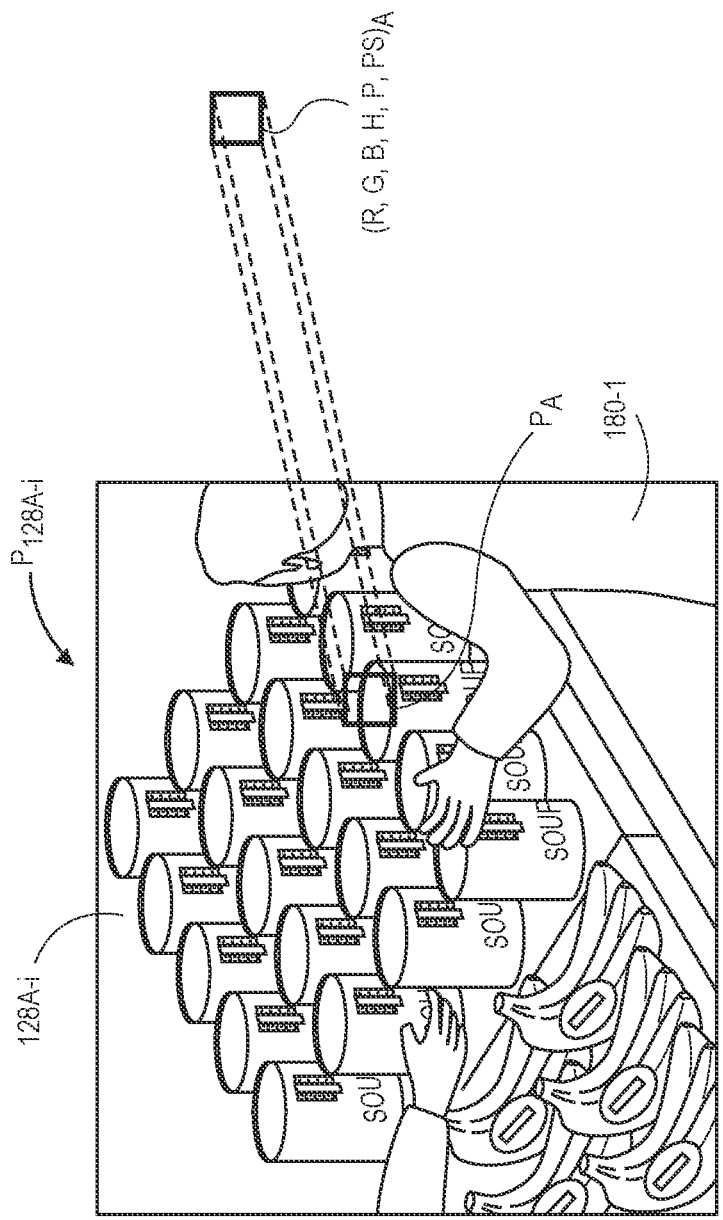

As is discussed above, images may be masked, layered or stacked to include information or data regarding their contents, which may be incorporated into such images or data structures representing such images. For example, as is shown in FIG. 1E, an image 128A-i derived from the image 126A-i includes a plurality of pixels $P_{128A-i}$ in a multi-channel (e.g., six-channel) form, such that each of the pixels $p_A$ includes channels corresponding to a color red (or "R"), a color green (or "G") and a color blue (or "B") of the pixel $p_A$, respectively, as well as a channel indicating whether the pixel $p_A$ depicts a portion of a hand (or "H"), a portion of a product or item (or "P") and a portion of a product space (or "PS"), or is represented as (R, G, B, H, P, PS)$_A$. In some implementations, the channels R, G, B corresponding to the colors red, green or blue of the pixel $p_A$ have any value or are provided according to any standard. In some implementations, the channels H, P, PS indicating whether the pixel $p_A$ depicts a portion of a hand, a portion of a product (or item) or a portion of product space may be binary in nature, such as having a first value indicating that the pixel $p_A$ depicts a portion of a hand, a product or a product space, or a second value indicating that the pixel $p_A$ does not depict any portion of a hand, a product or a product space, e.g., values of one or zero, or any other values.

Figure 1F:
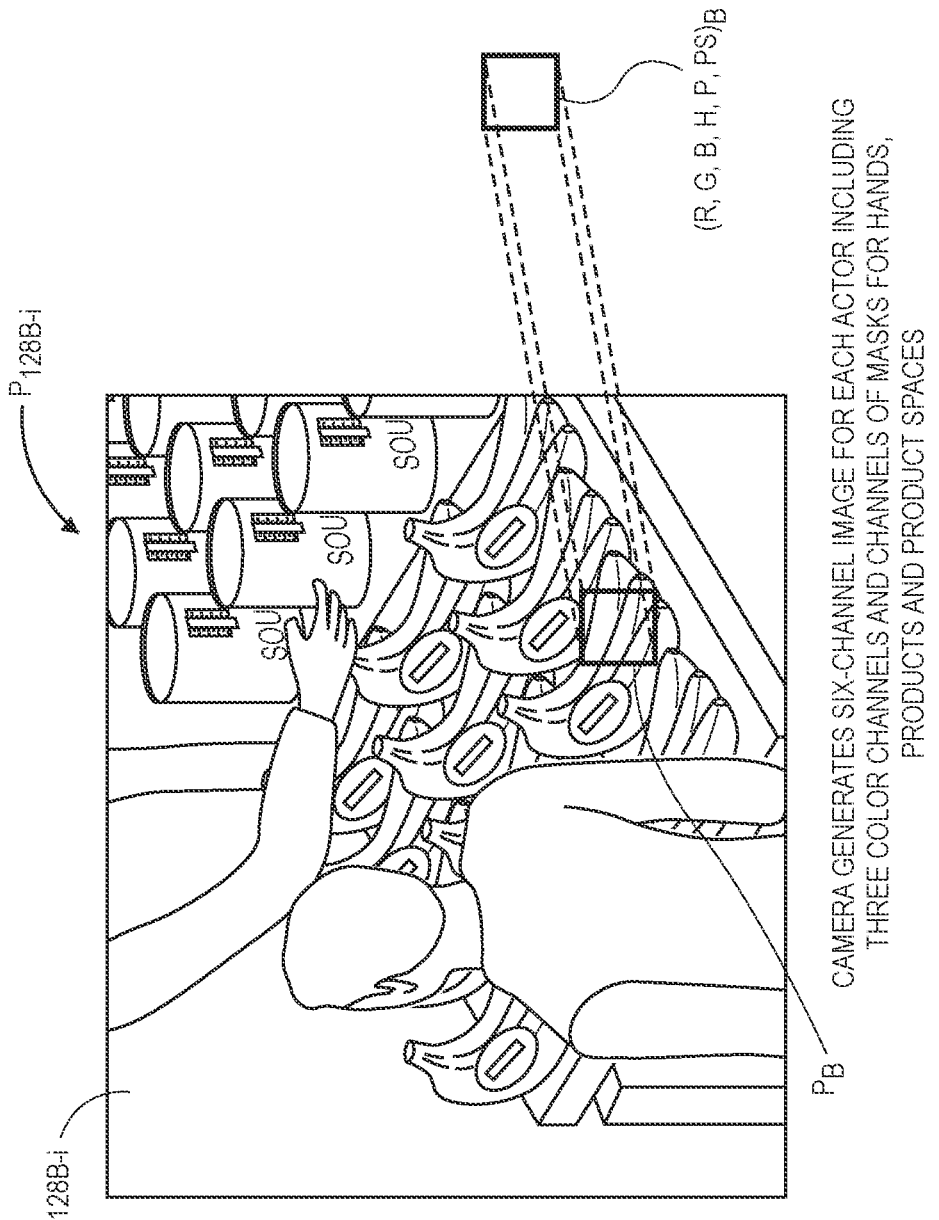

Similarly, as is shown in FIG. 1F, an image 128B-i derived from the image 126B-i includes a plurality of pixels $P_{128B-i}$ in a multi-channel form, such that each of the pixels $p_B$ includes channels corresponding to the colors red, green or blue (or "R," "G" or "B") of the pixel $p_B$, respectively, as well as channels indicating whether the pixel $p_B$ depicts a portion of a hand, a portion of a product (or item), or a portion of a product space (or "H, "P" or "PS").

Figure 1G:
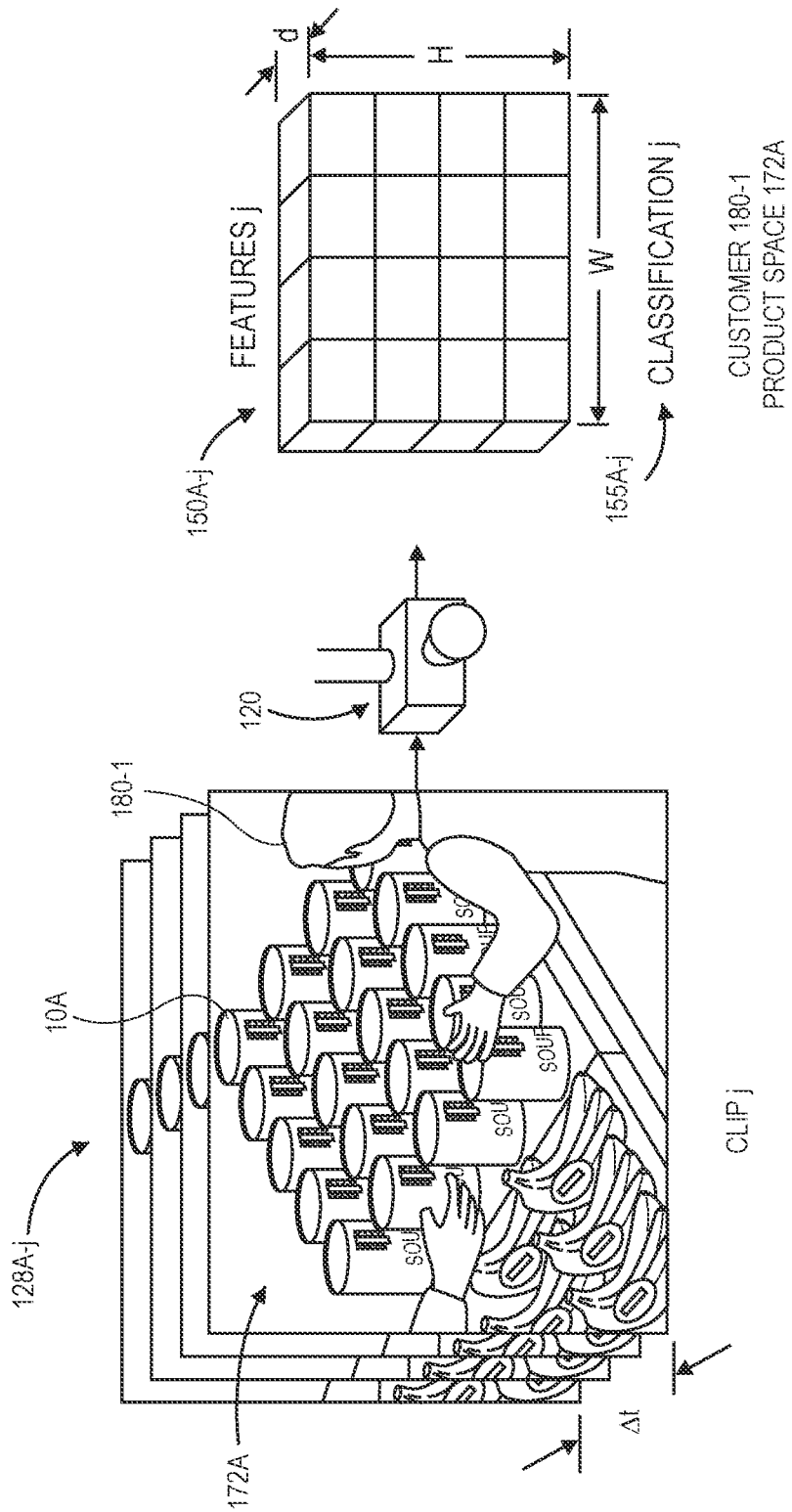

In accordance with implementations of the present disclosure, clips or other sets of images (e.g., cropped and masked, layered or stacked images) depicting product spaces that are captured or generated by the camera 120 may be defined to include any number of such images, or images captured over a period of any duration. The clips or sets may be processed to determine features of the images of the clips, and to classify whether such clips depict any action by an actor depicted therein. As is shown in FIG. 1G, a clip of images 128A-j is shown. The images 128A-j of the clip include multi-channel images derived from images captured by the camera 120 over a period of time (or interval) Δt that have been cropped and centered to include only the product space 172A and the items 10A thereon, such as the image 128A-i shown in FIG. 1E.

The images 128A-j of the clip shown in FIG. 1G may be provided to a machine learning model operated by one or more processor units of the camera 120, e.g., a "clip model," or any other type of model, that is trained to generate a set of spatial-temporal features 150A-j of such images 128A-j with respect to an actor and a product space, viz., the actor 180-1 and the product space 172A, and to determine or predict a classification 155A-j as to whether such images 128A-j depict one or more actions (e.g., a taking or picking event, or a return or deposit event) by an actor represented therein with the product space, or whether such images 128A-j do not depict any of such actions. In some implementations, the model operating on the camera 120 may include a "slow-fast" model, or a dual-model convolutional neural network, as a backbone trained to detect features of the images 128A-j, and may also include a multi-level perceptron network or another model trained to classify any actions depicted within the images 128A-j. Alternatively, the model operating on the camera 120 may take any other form or may operate in any other manner in accordance with implementations of the present disclosure.

The features 150A-j of the images 128A-j may have any dimensions, such as a dimension d, a dimension W and a dimension H. In some implementations, the dimension d may correspond to a number of layers or channels of a machine learning model used to derive the features 150A-j from such images 128A-j. In some other implementations, the dimensions W and H may be downsampled or otherwise reduced or adjusted with respect to dimensions of the images 128A-j.

Figure 1H:
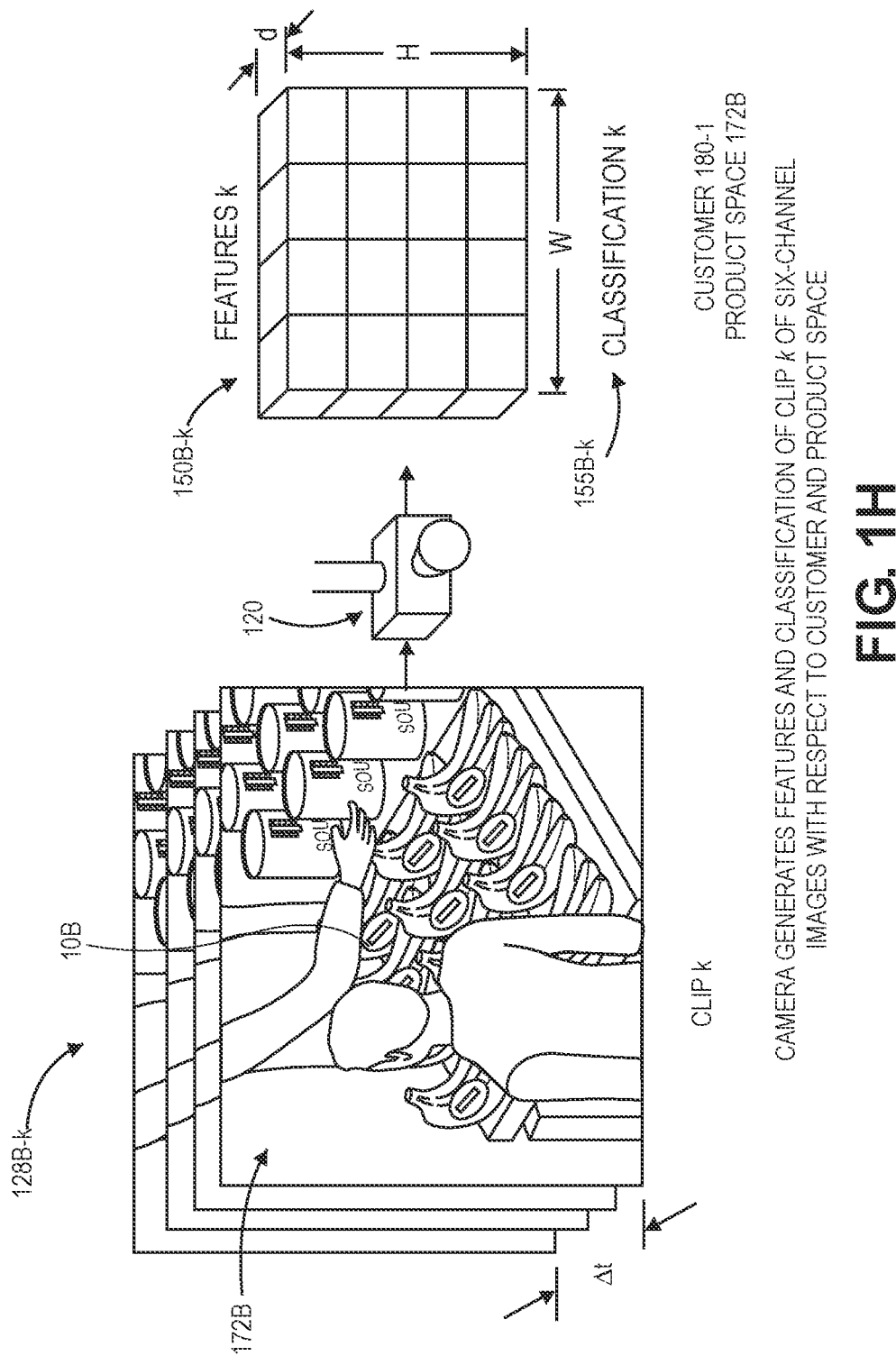
Figure 11:
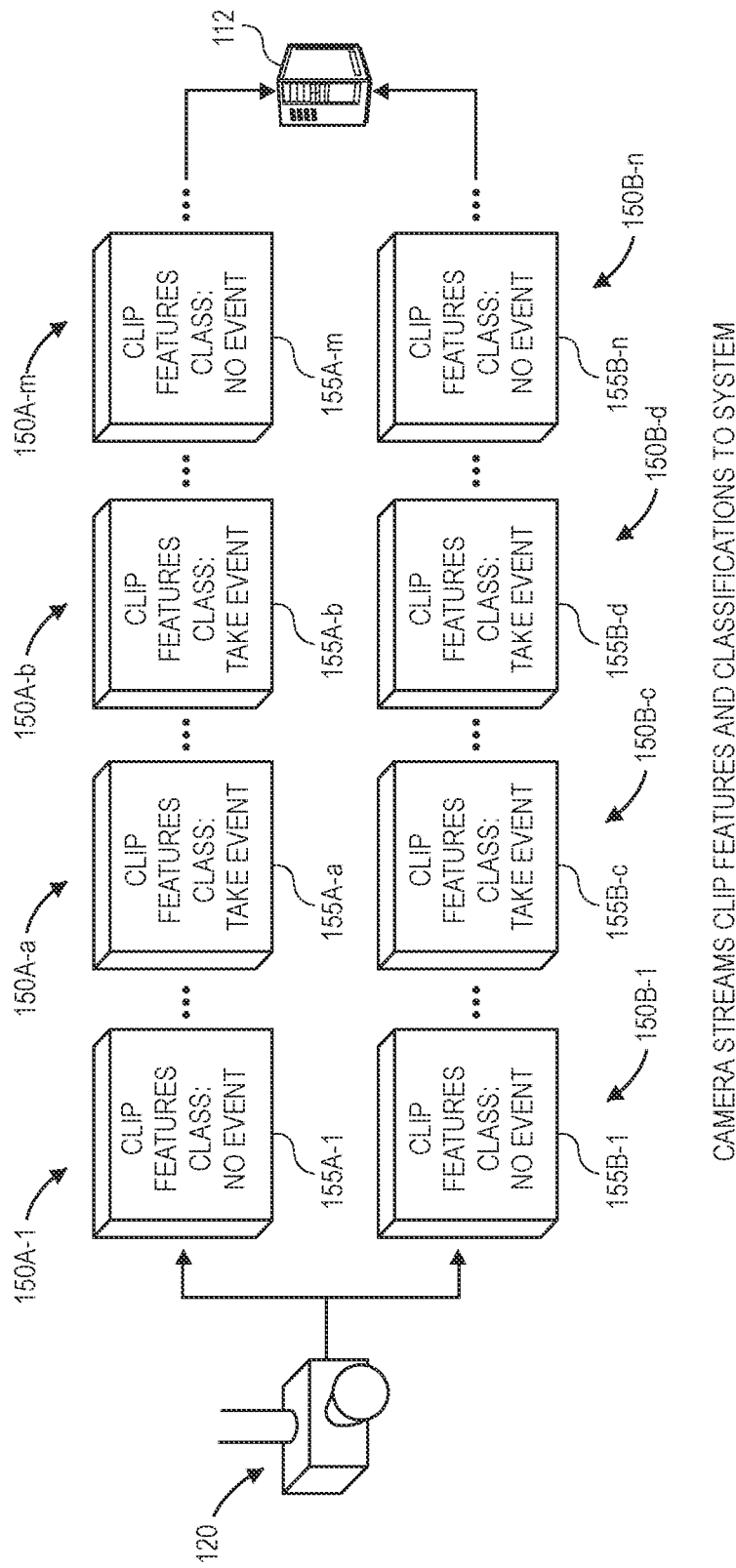

Similarly, as is shown in FIG. 1H, a clip of images 128B-k is shown. The images 128B-k of the clip include multi-channel images derived from images captured by the camera 120 over a period of time (or interval) Δt that have been cropped and centered to include only the product space 172B and the items 10B thereon, as well as the actor 180-1, such as the image 128B-i shown in FIG. 1F. The images 128B-k of the clip shown in FIG. 1H may be provided to the same machine learning model, e.g., the "clip model," that were used to generate the set of spatial-temporal features 150A-j or the classification 155A-j shown in FIG. 1G, or another machine learning model, to detect a set of spatial-temporal features 150B-k of such images 128B-k with respect to the actor 180-1 and the product space 172B, and to determine or predict a classification 155B-k as to whether such images 128B-k depict one or more actions by the actor 180-1 with the product space 172B, or do not depict any of such actions. The features 150B-k of the images 128B-k may have any dimensions, such as a dimension d, a dimension W and a dimension H.

In some implementations, the camera 120 may calculate features for clips of images and classify clips of any number of images, e.g., eight images, or any other number of images, that were captured over any interval or duration of time, e.g., one second, or one-and-one-half seconds, or any other interval or duration. Such clips may include every image captured by the camera 120 in a series or sequence, or fewer than all of such images, e.g., every other image of the series or sequence, or every third image of the series or sequence, as long as one or more actors is depicted within such images, or otherwise detected within a field of view of the camera 120. Furthermore, in some implementations, each of such images may be processed to determine a probability or a likelihood that any of such images depicts any of the actors detected therein executing an event or interaction with one of the product spaces 172A, 172B. In such implementations, features may be calculated for a clip of images with respect to only actors and product spaces for which a probability or a likelihood of interaction is sufficiently high, and not for other actors or other product spaces. Alternatively, features may be calculated for clips, and such clips may be classified, with respect to every actor and every product space depicted therein, regardless of a likelihood or probability that a given actor is executing an event or interaction with any or all of the product spaces.

Features generated from clips of images captured by the camera 120, and classifications of such clips, may be transmitted to a system, such as the system 112, in real time or in near-real time as such features and classifications of such clips are generated. For example, as is shown in FIG. 1I, a stream of features 150A-1 . . . 150A-a . . . 150A-b . . . 150A-m and corresponding classifications 155A-1 . . . 155A-a . . . 155A-b . . . 155A-m derived with respect to the actor 180-1 and the product space 172A are transmitted to the system 112. The classifications 155A-1 . . . 155A-a . . . 155A-b . . . 155A-m indicate that the features 150A-a and the features 150A-b depict or represent taking events involving the actor 180-1 and the product space 172A, and that the features 150A-1 and the features 150A-m do not depict or represent any events. Likewise, as is also shown in FIG. 1I, a stream of features 150B-1 . . . 150B-c . . . 150B-d . . . 150B-n and corresponding classifications 155B-1 . . . 155B-c . . . 155B-d . . . 155B-n derived with respect to the actor 180-1 and the product space 172A are transmitted to the system 112. The classifications 155B-1 . . . 155B-c . . . 155B-d . . . 155B-n indicate that the features 150B-c and the features 150B-d depict or represent taking events involving the actor 180-1 and the product space 172B, and that the features 150B-1 and the features 150B-n do not depict or represent any events.

Figure 1J:
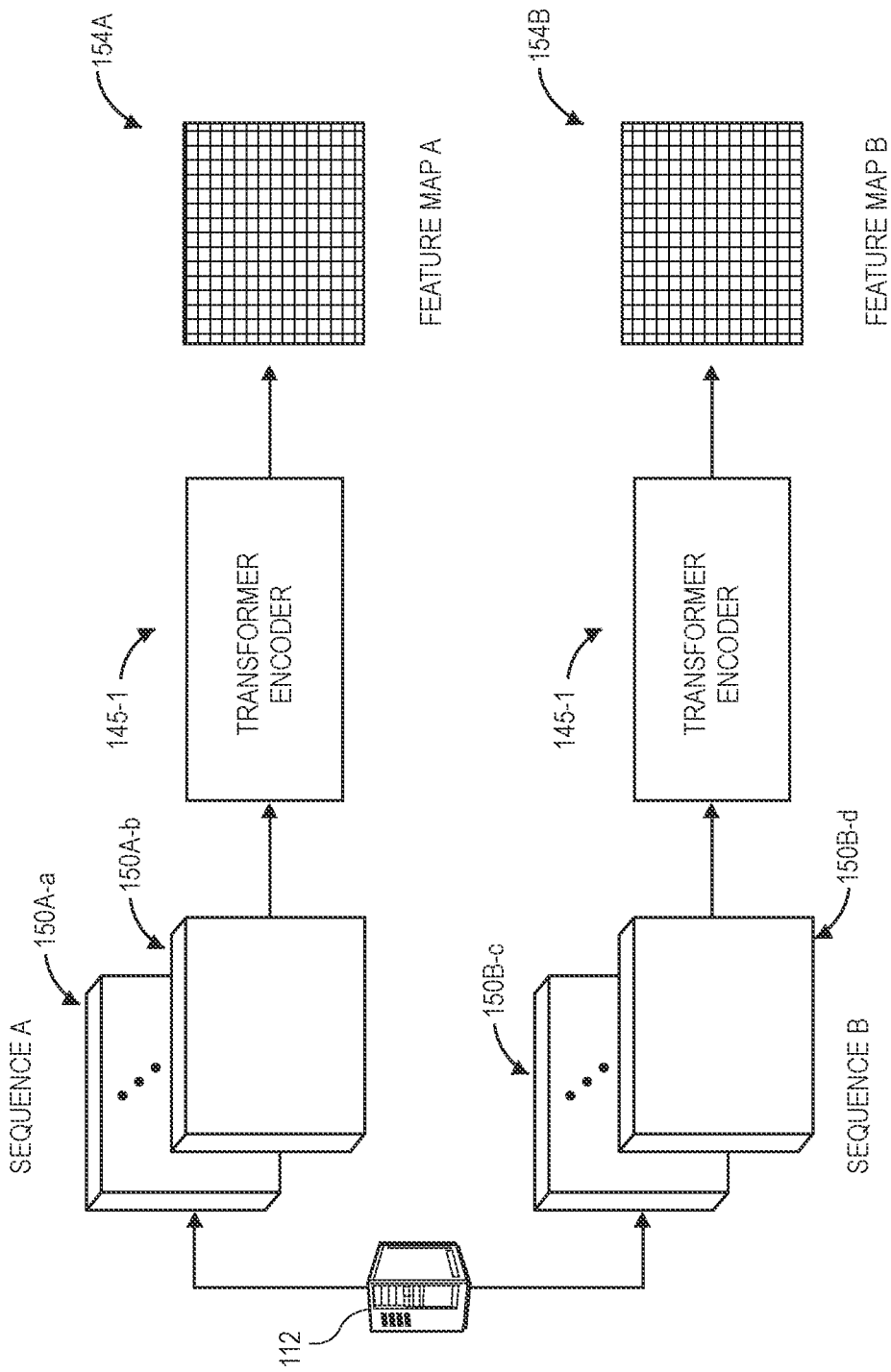

Sequences of features of clips that have been classified as depicting an event, e.g., by a clip model, may be generated and processed to determine a shopping hypothesis (or an event hypothesis) from such sequences. For example, as is shown in FIG. 1J, a sequence of the features 150A-a . . . 150A-b that have been classified as depicting a taking event by the actor 180-1 and the product space 172A are provided as an input to a transformer encoder 145-1 or another machine learning model. The sequence of the features 150A-a . . . 150A-b may be defined as having a start time associated with an earliest of the features to have been identified as depicting an event, e.g., the features 150A-a, and an end time associated with a latest of the features to have been identified as depicting the event, e.g., the features 150A-b, or after a predetermined number or threshold of consecutive features has been identified as depicting the event. Moreover, in some implementations, the sequence may be identified as having ended where a predetermined number of consecutive features have been identified as not depicting the event. Additionally, a sequence of the features 150B-c . . . 150B-d that have been classified as depicting an event by the actor 180-1 and the product space 172B are provided as an input to the transformer encoder 145-1. The sequence of the features 150B-c, 150B-d may be defined as having a start time and an end time associated with each of the features 150B-c, 150B-d.

The transformer encoder 145-1 may be configured to model similarities among the various features 150A-a . . . 150A-b of the sequence of clips determined to depict an event involving the actor 180-1 and the product space 172A, or the various features 150B-c . . . 150B-d of the sequence of clips determined to depict an event involving the actor 180-1 and the product space 172B. In some implementations, where a sequence includes a number T of features 150A-a . . . 150A-b derived from clips, and wherein each of the features 150A-a . . . 150A-b has dimensions of d×H×W, the transformer encoder 145-1 may concatenate the features 150A-a . . . 150A-b and then flatten the spatial-temporal dimensions of such features 150A-a . . . 150A-b to generate a feature map 154A having dimensions of T×(d×H×W). The transformer encoder 145-1 may take any form, and may have an architecture including a multi-head self-attention module and a feed forward network or any other attributes or components. Similarly, the sequence of the features 150B-c . . . 150B-d may be provided as an input to the transformer encoder 145-1, and be processed to generate a feature map 154B having any dimensions, e.g., dimensions of T×(d×H×W).

Figure 1K:
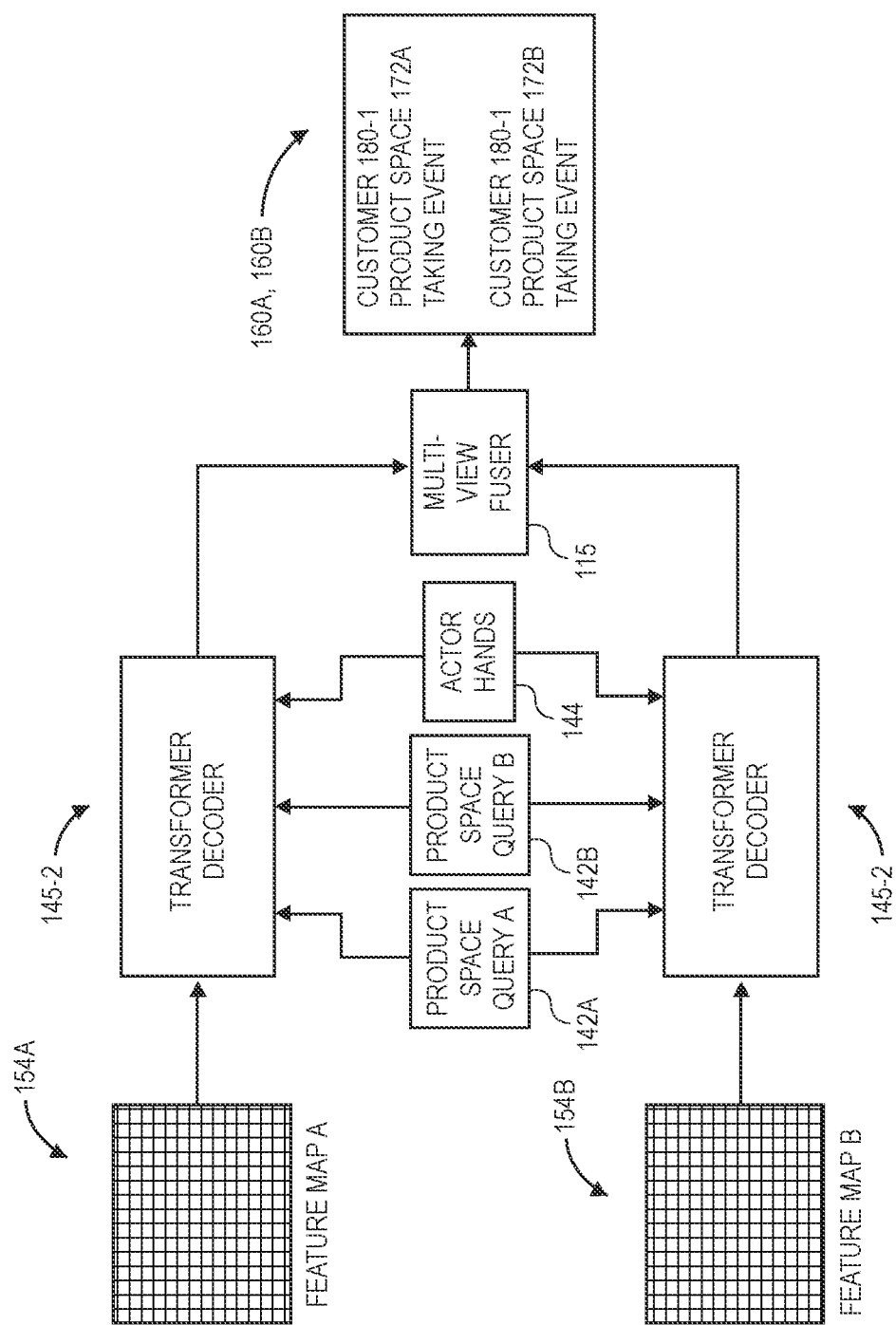

The feature maps 154A, 154B include spatial-temporal features derived from the sequences of features 150A-a . . . 150A-b, 150B-c . . . 150B-d that are representative of semantic meanings of different actions. As is shown in FIG. 1K, the feature maps 154A, 154B may be provided to a transformer decoder 145-2, along with product space queries 142A, 142B for each of the product spaces 172A, 172B, which represent actions that may have occurred at the particular product spaces 172A, 172B, viz., a taking or picking event, a return or deposit event or no action or event, or any other events, and positions 144 of the hands of the actor 180-1. The product space queries 142A, 142B may be feature vectors representing the respective product spaces 172A, 172B and may be processed to identify regions within the respective feature maps that align with the input of the respective queries 142A, 142B.

The transformer decoder 145-2 outputs embeddings that may be represented as individual labels corresponding to actions at the product spaces 172A, 172B, e.g., takes or picks, returns or deposits, or no actions or events, by the hands of the actor 180-1 based on the positions 144. Outputs received from the transformer decoder 145-2, viz., embeddings, may be provided to a multi-view fuser module 115 configured to aggregate embeddings generated by the transformer decoder 145-2. For example, the embeddings may represent predictions that specific events were executed by the actor 180-1 at the product spaces 172A, 172B. In particular, the prediction 160A indicates that the actor executed a taking event at the product space 172A and the prediction 160B indicates that the actor executed a taking event at the product space 172B.

The multi-view fuser module 115 may include a machine learning model (e.g., a multi-layer perceptron network) configured to process all transformer embeddings generated based on sequences of features of clips received from a set of cameras including the camera 120, for a given product space. In some implementations, the multi-view fuser model 115 may further include another machine learning model (e.g., another multi-layer perceptron network) configured to process any item-in-hand features received from cameras including the same product space within their respective fields of view. Alternatively, in some implementations, where a system includes only a single camera, the multi-view fuser module 115 need not be utilized.

Predictions 160A, 160B as to events that were executed by the actor 180-1 at the product spaces 172A, 172B within the field of view of the camera 120, e.g., a hypothesis, or a shopping hypothesis, may be determined based on outputs received from the multi-view fuser module 115. For example, the predictions 160A, 160B may be an embedding, or a set of embeddings, indicating that the actor 180-1 executed a taking event at the product space 172A and a taking event at the product space 172B.

Figure 1L:
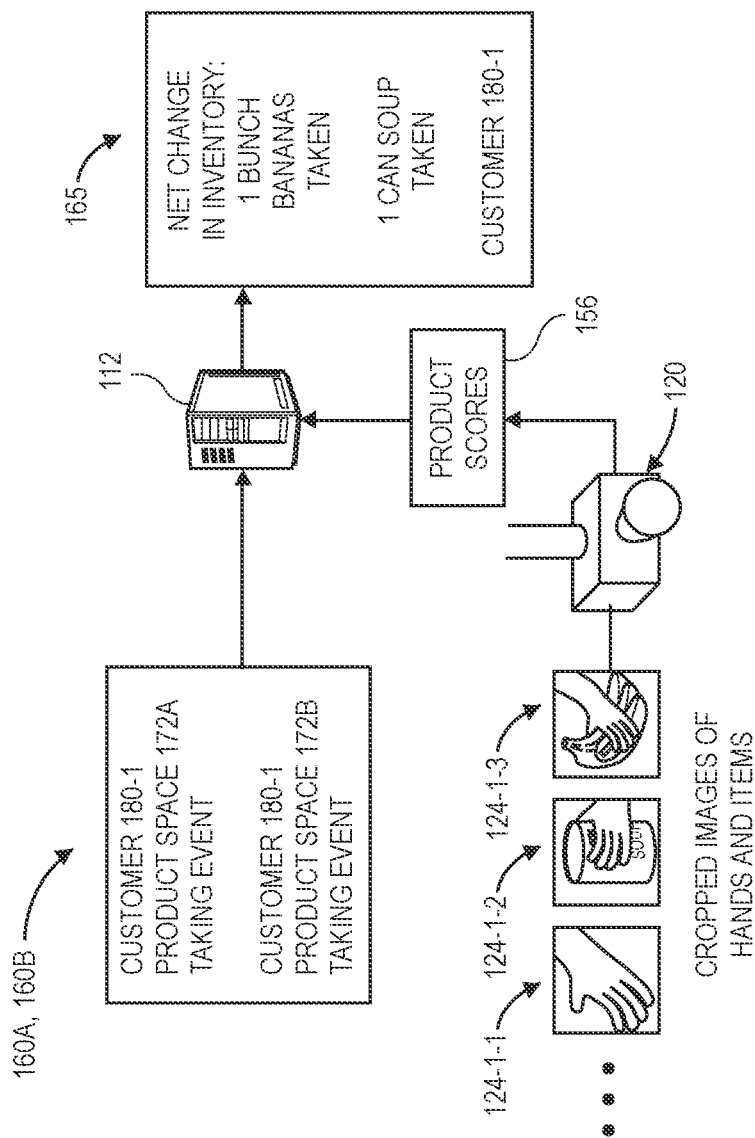

As is shown in FIG. 1L, the predictions 160A, 160B may be processed along with predictions from any other cameras (not shown) and product scores (or item scores) 156 determined from cropped portions 124-1-1, 124-1-2, 124-1-3 of hands of the actor 180-1 of images captured by the camera 120, such as is shown in FIG. 1C, to generate a net change 165 in inventory levels associated with actions of the actor 180-1 at the fixture 170. Where the items 10A, 10B are known to be regularly stored on or associated with the product spaces 172A, 172B, the product scores 156 may indicate the similarity of the contents of the hands of the actor 180-1, as determined from the portions 124-1-1, 124-1-2, 124-1-3, to attributes of the items 10A, 10B. In some implementations, the portions 124-1-1, 124-1-2, 124-1-3 may have been cropped from images captured by the camera 120. In some other implementations, the portions 124-1-1, 124-1-2, 124-1-3 may have been cropped from images captured by any other cameras (not shown) that include the fixture 170 within their respective fields of view.

In some implementations, the system 112 may process the embeddings representing the predictions 160A, 160B using one or more machine learning models, such as a multi-level perceptron network, and process the product scores 156 using another machine learning model, e.g., another multi-level perceptron network. Outputs from the respective machine learning models may be further processed to generate the net change 165 in inventory levels associated with actions of the actor 180-1. Additionally, in some implementations, the predictions 160A, 160B or hypotheses may be combined with one or more other hypotheses, e.g., in a forward continuous manner, to generate a summary of the net change 165 in inventory levels at the scene 110 resulting from actions of the actor 180-1.

Accordingly, the systems and methods of the present disclosure are directed to detecting events from image features that are generated from sequences of images captured using one or more cameras or other imaging devices. Where one or more clips of images are determined to depict an event executed by an actor in association with one or more product spaces of a fixture, features of such clips may be combined into a sequence and processed, e.g., using one or more transformers or other machine learning tools, to predict whether the sequence represents a taking or picking event, a return or a placement event, or no event or action at all. A change in inventory at the fixture may be determined based on such predictions determined from sequences of images captured using one or more cameras.

In some implementations, images (e.g., visual images) captured at a predetermined frame rate may be cropped as necessary to include product spaces depicted therein, or to exclude any background features therefrom. In some implementations, the images may be captured at a rate of fifteen frames per second (fps), or any greater or lesser frame rate. In some other implementations, segments or portions of each of the images that depict one or more body parts of actors (e.g., customers, workers, associates or other humans) may be identified, and the images may be masked, layered or stacked to include identifiers of locations of hands or other body parts, or any items within such hands, which may be tracked from image to image. Additionally, in some other implementations, the images captured by the cameras may be processed to determine a probability or likelihood that an actor (e.g., a customer) has executed an interaction with one or more product spaces of storage units depicted within such images.

Images may be masked, layered or stacked to include information or data regarding their contents, which may be incorporated into such images or data structures representing such images. For example, images may be modified into a multi-channel (e.g., six-channel) form, such that each pixel of the image includes channels corresponding to colors, e.g., a color red, a color green, and a color blue, as well as channels indicating whether the pixels depict portions of hands, products or items, or product spaces. Alternatively, the multi-channel images may include any number of channels corresponding to colors, e.g., four, where the images are generated according to the cyan-magenta-yellow-black (or "CMYK") standard, as well as any number of channels corresponding to any number of masks or other features.

A clip (or a set) of images (e.g., multi-channel images, such as six-channel images) may be defined for a given actor and a given product space, and may include a predetermined number of the images captured in series, or images captured in series over a predetermined interval of time. Images of a clip or set may be cropped, reoriented or otherwise configured to include a product space substantially in a central location or region of the images, as necessary.

Images of a clip or set may be processed to extract spatial-temporal features regarding such images, and to predict whether the clip or set depicts an event that occurred at a time associated with the clip or set. In some implementations, a camera may extract features from images of a clip or set by providing the images as inputs to a machine learning model, such as a "clip model," with a slow-fast model (e.g., a machine learning model having both "slow" and "fast" pathways), or a dual-model convolutional neural network, as a backbone. A set of features of the clip or set may be determined based on outputs received in response to the inputs. In some implementations, the clip or set of images may be classified to determine whether the clip or set of images depicts an event, e.g., a taking or picking event, a return or deposit event, or no event, by a multi-level perceptron network, or any other model.

Clips or sets of images that are processed to determine features therefrom may include any number of images captured over any period of time. Moreover, such clips or sets may overlap one another in time, such that images captured by a camera may be included in multiple clips or sets. Additionally, in some implementations, a sequence of features may be generated from multiple clips or sets of images that are determined to depict events. For example, where a clip or set is determined to depict an event, a time associated with the clip or set may be determined to be a start time of the event, and a sequence may be initially defined to include features determined from the clip or set. Subsequently captured clips or sets of images that are also determined to depict the event may be identified, and features determined for such clips or sets may be added to the sequence, until a predetermined number (e.g., one or more) of subsequently captured clips or sets of images are determined to not depict the event, and features determined for such clips or sets are not added to the sequence. A time associated with a final clip or set of a sequence may be determined to be an end time of the event. Alternatively, an end time of an event may be determined to be a time associated with a predetermined number of consecutive clips or sets that are determined to depict the event.

In some implementations, sequences of features generated from clips or sets of images may be provided to a transformer or another machine learning model that is trained to generate a hypothesis as to whether such clips or sets of images depict any shopping events. In some implementations, the transformer or other machine learning model may include an encoder that is configured to model similarities among all clip-level features of a sequence. For example, where a sequence includes features determined from a predetermined number of clips, with each of the features having a fixed set of spatial-temporal dimensions, the features of the sequence may be concatenated and flattened to a single dimension and a two-dimensional feature map may be generated accordingly. In some implementations, an encoder of the transformer may include a standard architecture having a module (e.g., a multi-head self-attention module) and a feedforward network. Alternatively, the encoder of the transformer may have any other architecture or construction.

In some implementations, the transformer or other machine learning model may further include a decoder that is configured to receive inputs including any number of learned positional embeddings, e.g., queries, such as product space queries, lane queries, or other queries, for each of the product spaces as well as the outputs received from the encoder, e.g., the feature maps. Based on such inputs, the decoder generates action features for each of the product spaces that may then be decoded independently into a set of embeddings representing predictions for each of such product spaces.

In some implementations, sets of embeddings generated for sequences of clips of images captured by one or more cameras may be aggregated along with information regarding items detected within hands of actors in images captured by such cameras to determine a prediction or a hypothesis of shopping events for a given actor at each of the product spaces, e.g., by fusing sequences of features corresponding to common events depicted within images captured by multiple cameras, as necessary. Moreover, in some implementations, net quantities of items associated with multiple events may be determined for individual actors, and the net quantities may be associated with the respective actors accordingly.

For example, where a prediction or hypothesis indicates that an actor has executed one or more shopping events or other interactions at product spaces of storage units, information or data (e.g., planogram data) associating the storage units with one or more inventory items, as well as a number of items determined to be within such hands prior to or after the shopping events or interactions, and identities of any of such items, may be used to update a record associated with the actor.

In some implementations, cameras may be configured to capture visual imaging data at relatively high levels of resolution, or with any number of pixels per image or pixel densities, and at relatively high frame rates. In some implementations, a camera may be configured to process images captured over an interval of time, e.g., fifteen frames per second, to generate features from such images at the same or a different frequency or interval, e.g., once per second, from images captured over the preceding interval of time. Furthermore, in some implementations, where hands or other body parts are detected within one or more images, the cameras may be programmed or otherwise configured to crop portions of the images depicting hands and process the cropped portions to determine a number of items within such hands, or to identify any such items. Numbers or identities of items within hands may be included in a hypothesis determined from such features.

Each of the cameras may operate one or more machine learning systems to detect and locate body parts or other objects within images, and generate maps, positions or other representations of such body parts in 3D space from such images. Each of the cameras may be further configured to crop or otherwise isolate portions of such images depicting hands, and to determine whether the hands depicted therein contain any items (e.g., whether the hands are empty or full), or to identify any items within the hands.

In some implementations, one or more processors or processor units provided on cameras or other computer devices or systems may execute machine learning models (algorithms, systems or techniques such as artificial neural networks, e.g., convolutional neural networks) that are trained to receive images captured by the cameras as inputs and to generate one or more outputs associated with tasks relating to the images. Such tasks may include the detection of body parts (e.g., hands, heads, shoulders or others) within images, the identification of portions or segments of images depicting such body parts or the analysis of such portions or segments to determine whether any of such body parts includes an item, or the calculation of distances between body parts and locations of items. The models may have any number of layers associated with the performance of such tasks, or others.

In some implementations, cameras or other computer devices or systems may be configured to operate machine learning models that are trained to perform multiple tasks based on a single input. For example, in some implementations, a camera may execute a model that performs body part detection, cropping or isolation, object recognition, or other tasks based on each visual images captured thereby.

The model may be constructed with a common, shared backbone and with one or more separate decoding layers, task layers, middle layers, or others. In some implementations, a model may be a convolutional neural network having one or more layers dedicated to the performance of each of a plurality of tasks, e.g., in a common architecture.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is scattered or reflected from objects, and by subsequently calculating or assigning one or more quantitative values to aspects of the scattered or reflected light, e.g., image pixels, then generating an output based on such values, and storing such values in one or more data stores. For example, a camera may include one or more image sensors (e.g., a photosensitive surface with a plurality of pixel sensors provided thereon), having one or more filters associated therewith. Such sensors may detect information regarding aspects of any number of image pixels of the scattered or reflected light corresponding to one or more base colors (e.g., red, green or blue), or distances to objects from which the light was scattered or reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Scattered or reflected light may be captured or detected by an imaging device if the light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is scattered or reflected off objects of any kind to a sufficiently high degree of resolution using one or more sensors thereof, and store information regarding the scattered or reflected light in one or more data files.

Many imaging devices also include manual or automatic features for modifying their respective fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a camera may virtually stretch or condense the pixels of an image in order to focus or broaden the field of view of the camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more machine learning models (e.g., algorithms, systems or techniques). The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which detecting events is desired, including but not limited to events involving humans or machines and any other objects. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to locate body parts of human operators (e.g., customers, workers or other personnel) and/or component parts of machines (e.g., autonomous mobile robots) and to recognize interactions involving such humans or machines within a materials handling facility, including but not limited to interactions with one or more items (e.g., consumer goods) or other inanimate objects within the materials handling facility. Such systems and methods may also be utilized to locate objects within transportation centers, financial institutions or like structures in which diverse collections of people, objects or machines enter and exit from such environments at regular or irregular times or on predictable or unpredictable schedules. By relying on multiple imaging devices, motion of an object may be located even when the object is occluded in one or more of the fields of view of the imaging devices. Moreover, as used herein, the term "machine learning model" or like terms, may include, but is not limited to, any type or form of machine learning algorithm, system, technique, method, operations, or tool, in a physical or a virtual form, and need not be limited to discrete hardware systems provided for such purposes.

Figure 2A:
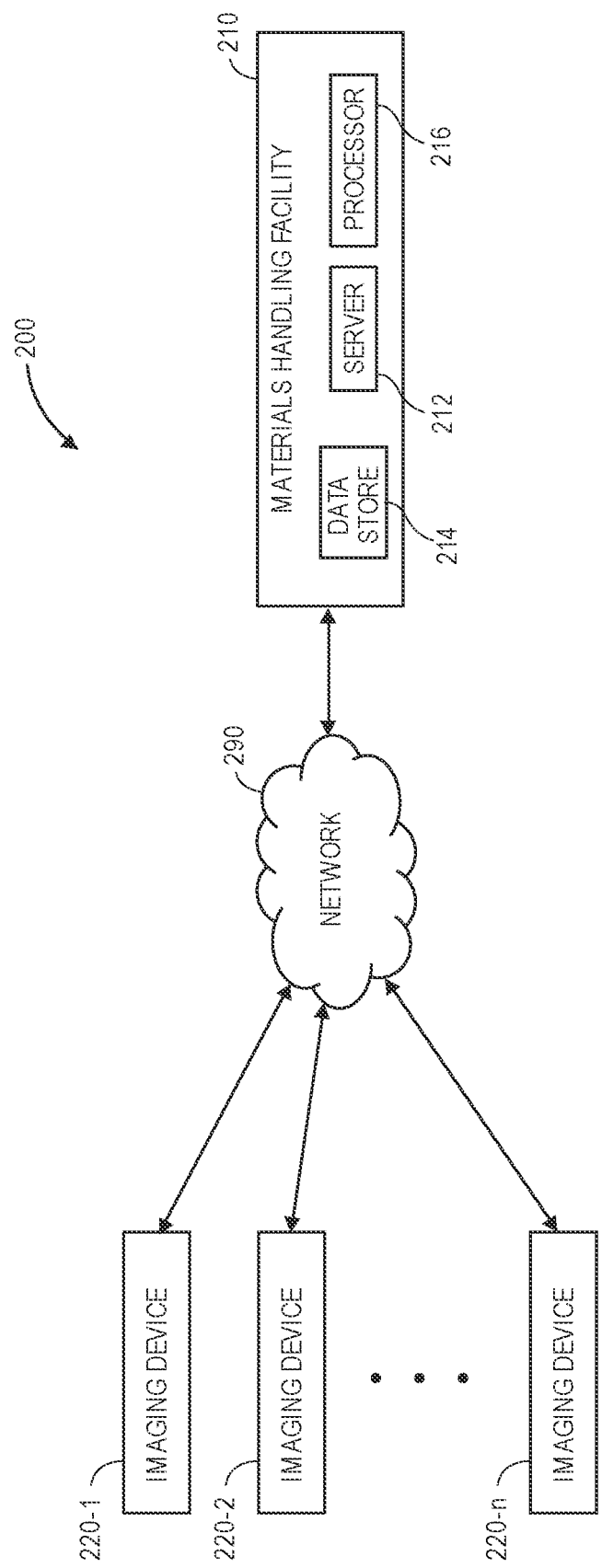
FIGS. 2A and 2B are block diagrams of components of one system for detecting events in accordance with implementations of the present disclosure.
Figure 2B:
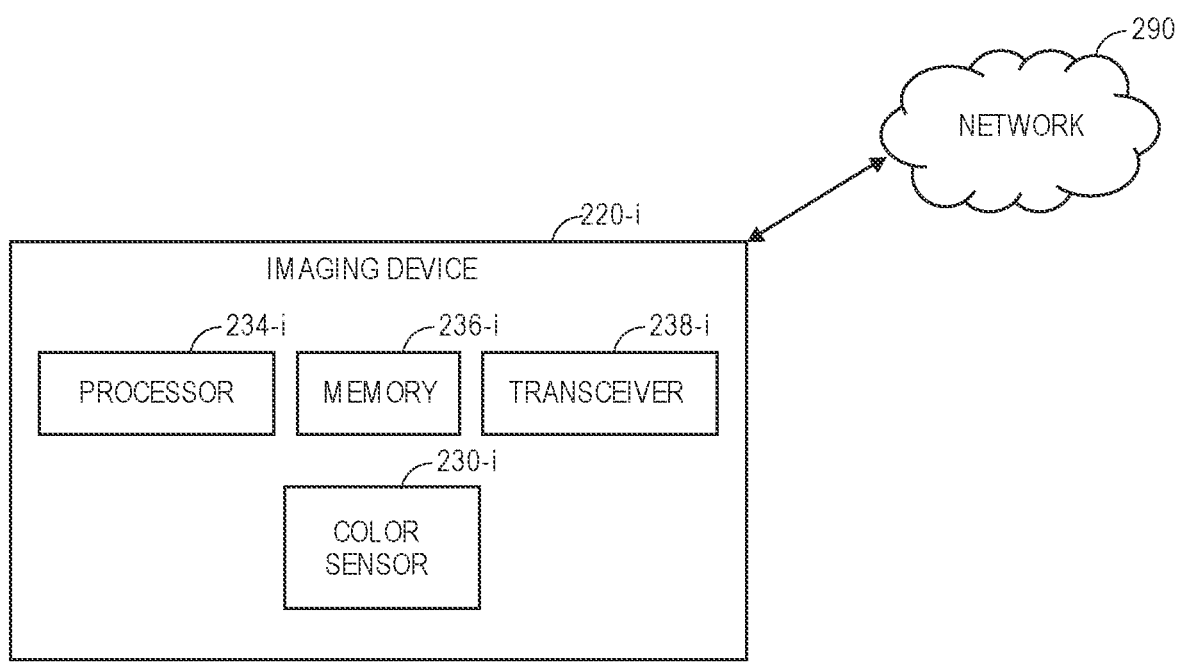

Referring to FIGS. 2A and 2B, a block diagram of components of one system 200 for detecting events in accordance with implementations of the present disclosure is shown.

The system 200 includes a materials handling facility 210 and a plurality of imaging devices 220-1, 220-2 . . . 220-$n$ that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1L.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or 3D storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, in order to transmit or receive information in the form of digital or analog data, or for any other purpose.

The materials handling facility 210 may be associated with a plurality of imaging devices 220-1, 220-2 . . . 220-n (or other sensors), which may be any form of optical recording device that may be used to photograph or otherwise record imaging data of structures, facilities or items within the materials handling facility 210, or for any other purpose. The imaging devices 220-1, 220-2 . . . 220-n have diverse fields of view of the materials handling facility 210, or other scenes, that are configured to capture imaging data that may be processed to recognize and locate motion, locations and/or orientations of various actors within the materials handling facility 210. The imaging devices 220-1, 220-2 . . . 220-n may be mounted in any specific location or orientation within the materials handling facility 210, e.g., above, below or alongside one or more inventory areas or stations for receiving or distributing items. Alternatively, the imaging devices 220-1, 220-2 . . . 220-n may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative one of the imaging devices 220-1, 220-2 . . . 220-n, viz., an imaging device 220-i, includes one or more optical sensors, including color sensors (or grayscale sensors or black-and-white sensors) 230-i configured to capture visual imaging data (e.g., textures) of objects within one or more fields of view of the imaging device 220-i. Optionally, the imaging device 220-i may include any number of depth sensors that are configured to capture depth imaging data (e.g., ranges) to objects within the one or more fields of view of the imaging device 220-*i*.

The imaging device 220-*i* further includes one or more processors 234-*i*, one or more memory components 236-*i* and one or more transceivers 238-*i*, and any other components (not shown) that may be required in order to capture, analyze and/or store imaging data from within the materials handling facility 210 environment in which the imaging device 220-*i* is provided. For example, the imaging device 220-*i* may capture one or more still or moving images (e.g., streams of visual images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-*i* may be configured to enable the imaging device 220-*i* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-*i* may be configured to execute an artificial neural network, such as a convolutional neural network, to process imaging data captured by one or more of the color sensors 230-*i*. For example, the artificial neural networks executed by the processors 234-*i* may perform tasks in one or more core areas, including but not limited to person detection, feature extraction, person linking and unlinking. In some implementations, one such neural network may be a neural network backbone (e.g., a residual neural network backbone) that is configured to perform one or more tasks for locating actors based on images captured by the imaging device 220-*i*, including but not limited to one or more of person detection (e.g., head detection), person bounding box generation, instance segmentation, and person locating in 3D space based on visual images (e.g., RGB images). The processors 234-*i* may be configured to execute multi-task networks having shared backbones and one or more decoding layers.

For example, in some implementations, the processors 234-*i* may operate an artificial neural network or other classifier that receives an image (e.g., a visual image, or an RGB image) as an input, and processes the image for one or more person detection (e.g., head detection, bounding box generation, instance segmentation, and line segment estimation) for any number of actors depicted within the image. Based on such detections, visual descriptors of pixels depicting the actors, including but not limited to appearance features of such actors, e.g., sets of information or data identifying colors, textures, shapes or other aspects of features of such actors, may be determined. The processors 234-*i* may also define a trajectory or "tracklet," e.g., a record of the positions of an actor at various times beginning at an initial detection and following with subsequent detections. Trajectories or tracklets and visual descriptors generated by the processors 234-*i* may be used to link detections of actors in consecutively captured frames to one another, or to reidentify a previously detected actor if the actor is not detected for a brief period of time.

In some implementations, the processors 234-*i* may predict a 3D location of an actor by detecting a head within an image and determining or estimating a height of the actor, or a line segment extending between the detected head of the actor and a corresponding location of a floor or other ground surface, within the image (e.g., a 2D line segment), which is aligned along a line extending from the detected head of the actor to a vertical vanishing point to which all vertical lines shown within the image converge. A line segment determined for an actor may be used to determine a 3D position of the actor based on intrinsic properties of the camera and a pose of the actor. The length of the line segment may be predicted upon a detection of a head within the image. In some implementations, the processors 234-*i* may predict a length of the line segment corresponding to an actor based on an output received from an artificial neural network that also detected a head of the actor, and utilize the line segment to determine a 3D location of the actor.

In some implementations, the processors 234-*i* may execute one or more tracking or matching algorithms, e.g., a tracking-by-detection algorithm, or a bipartite matching algorithm, that generates a tracklet-to-detection assignment or a visual descriptors-to-detection assignment over consecutive frames given an edge cost matrix. If a trajectory or tracklet, or visual descriptors of a set of pixels, are not matched to a body part detection (e.g., head detection), the processors 234-*i* may execute one or more optical flow algorithms on successive frames to extend a trajectory or tracklet location into a successively captured frame. Additionally, a confidence classifier may generate a confidence score in a given assignment. Moreover, the processors 234-*i* may change a manner or technique by which a given actor is located from frame to frame. For example, processors 234-*i* may locate actors based on body part detections (e.g., head detections) when such body parts are visible within an image frame, or may alternatively switch to locating via a set of visual descriptors of pixels corresponding to an actor (e.g., a bounding box or instance segmentation), to the extent that the visual descriptors of pixels are consistent from image frame to image frame.

In some implementations, nodes corresponding to body parts detected by the imaging devices 220-1, 220-2 ... 220-*n* may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to 3D rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a 3D track or trajectory of a body part or an actor from two-dimensional observations of the body part or the actor in images may be utilized in accordance with the present disclosure.

Moreover, in some implementations, the processors $234\text{-}i$ may combine trajectories or tracklets when corresponding positions are sufficiently proximate to one another and one of the trajectories or tracklets has a sufficiently low level of confidence., or on any other basis.

The imaging devices $220\text{-}1$, $220\text{-}2$ . . . $220\text{-}n$ may be homogenous or heterogeneous in nature, in accordance with the present disclosure. For example, one or more of the imaging devices $220\text{-}1$, $220\text{-}2$ . . . $220\text{-}n$ may have both the color sensor $230\text{-}i$ and a depth sensor. Alternatively, one or more of the imaging devices $220\text{-}1$, $220\text{-}2$ . . . $220\text{-}n$ may have just a color sensor $230\text{-}i$ (or grayscale sensor or black-and-white sensor). Additionally, one or more of the imaging devices $220\text{-}1$, $220\text{-}2$ . . . $220\text{-}n$ may be configured to capture visual imaging data, e.g., visual images or images in color, grayscale or black-and-white. In some implementations, one or more of the imaging devices $220\text{-}1$, $220\text{-}2$ . . . $220\text{-}n$ may also be configured to capture depth imaging data, e.g., distances or ranges to objects within their respective fields of view.

For example, one or more of the imaging devices $220\text{-}1$, $220\text{-}2$ . . . $220\text{-}n$ may be an RGB color camera, a still camera, a motion capture/video camera or any other type or form of camera. In other implementations, one or more of the imaging devices $220\text{-}1$, $220\text{-}2$ . . . $220\text{-}n$ may be depth-sensing cameras, such as an RGBz or RGBD camera. In still other implementations, one or more of the imaging devices $220\text{-}1$, $220\text{-}2$ . . . $220\text{-}n$ may be a thermographic or infrared (IR) camera. Additionally, in some implementations, the imaging devices $220\text{-}1$, $220\text{-}2$ . . . $220\text{-}n$ may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860×480 in an image, and capturing images at a frame rate of at least six frames per second, that may likewise be configured to provide image data to other components (e.g., a graphics processing unit) for processing. In some implementations, the imaging devices $220\text{-}1$, $220\text{-}2$ . . . $220\text{-}n$ may be paired to provide stereo imagery and depth information, and may include a pair of camera modules. Additionally, imaging data may be stored in any variety of formats, including but not limited to YUYV, RGB, RAW, .bmp, .jpeg, .gif, or the like.

The imaging devices $220\text{-}1$, $220\text{-}2$ . . . $220\text{-}n$ may also include manual or automatic features for modifying their respective fields of view or orientations. For example, one or more of the imaging devices $220\text{-}1$, $220\text{-}2$ . . . $220\text{-}n$ may be configured in a fixed position, or with a fixed focal length (e.g., fixed-focus lenses) or angular orientation. Alternatively, one or more of the imaging devices $220\text{-}1$, $220\text{-}2$ . . . $220\text{-}n$ may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices $220\text{-}1$, $220\text{-}2$ . . . $220\text{-}n$, or changes in one or more of the angles defining the angular orientation.

For example, one or more of the imaging devices $220\text{-}1$, $220\text{-}2$ . . . $220\text{-}n$ may be hard-mounted to a support or mounting that maintains the device in a fixed configuration or angle with respect to one, two or three axes. Alternatively, however, one or more of the imaging devices $220\text{-}1$, $220\text{-}2$ . . . $220\text{-}n$ may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device. In some implementations, two or more of the imaging devices $220\text{-}1$, $220\text{-}2$ . . . $220\text{-}n$ may be provided within a common housing, e.g., a dual camera module housing.

Some of the imaging devices $220\text{-}1$, $220\text{-}2$ . . . $220\text{-}n$ may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices $220\text{-}1$, $220\text{-}2$ . . . $220\text{-}n$, e.g., digital cameras, may be affected based on the lighting conditions and characteristics of the scenes in which the imaging devices $220\text{-}1$, $220\text{-}2$ . . . $220\text{-}n$ are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices $220\text{-}1$, $220\text{-}2$ . . . $220\text{-}n$, those of ordinary skill in the pertinent arts will recognize that any number or type of imaging devices may be provided within the materials handling facility 210 in accordance with the present disclosure, including but not limited to digital cameras, infrared cameras, radiographic cameras or other devices having one or more optical sensors. In some implementations, the system 200 (e.g., the materials handling facility 210) may include dozens or even hundreds of imaging devices of any type or form. Moreover, the system 200 (e.g., the materials handling facility 210) may also include any other type of sensing systems for detecting actors and recognizing their motion, locations and/or orientations within the materials handling facility 210. Such sensors may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors that may gather information or data regarding actors and their motion, locations and/or orientations at the materials handling facility 210 are not limited.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-n, or with one or more computer devices or resources, such as the servers 212, over the network 290, as well as a display (e.g., a touchscreen display) to facilitate the visible presentation to and interaction with a human operator.

The servers 212 or any other computer devices associated with the materials handling facility 210 or connected to the network 290 may execute one or more multi-camera tracking algorithms or techniques. For example, in some implementations, the imaging devices 220-1, 220-2 . . . 220-n may provide their respectively determined trajectories or tracklets of actors and visual descriptors of pixels of images (e.g., appearance features, motion properties and geometry) depicting the actors to the server 212. Additionally, the server 212 may map single-camera trajectories or tracklets to positions in 3D space based on their respective predicted 3D line segments and their corresponding appearance features, motion properties and geometry in 3D space for the respective trajectories or tracklets. The server 212 may then correlate or merge trajectories or tracklets received from multiple ones of the imaging devices 220-1, 220-2 . . . 220-n into multi-camera trajectories or tracklets, and assign identifiers to the respectively correlated or merged trajectories or tracklets.

The servers 212 may further associate any multi-camera trajectories or tracklets with identifiers of actors within the materials handling facility 210 in any manner. For example, a unique identifier may be assigned to each multi-camera trajectory or tracklet, e.g., and such multi-camera trajectories or tracklets may be tracked based on single-camera trajectories or tracklets, and visual descriptors, received from the respective imaging devices 220-1, 220-2 . . . 220-n.

In some implementations, the system 200 may further include one or more event generator systems comprising sensors that are provided in one or more select locations within the materials handling facility 210. Each of such sensors may be configured to detect information or data from which a location at which an event has occurred, or a time (or duration) of the event, e.g., an interval of time that includes the time of the event. In some implementations, an item associated with an event may be identified based on the location and/or the time (or duration) of the event based on planogram data, which may indicate the placement of one or more items in inventory areas or storage units within the materials handling facility 210.

For example, one or more of such sensors may be an imaging device configured to capture imaging data regarding an inventory area and/or storage unit, e.g., one or more of the imaging devices 220-1, 220-2 . . . 220-n, and whether an event has occurred, and a time of such an event, may be determined based on such imaging data. One or more of such sensors may include load or weight sensors provided in association with an inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors may include one or more LIDAR components for transmitting and/or receiving one or more light signals in association with inventory areas and/or storage units, and whether an event has occurred, and a time of such an event, may be determined based on the light signals that are transmitted or received.

The type or form of such sensors provided in association with an event generator system are not limited. Moreover, one of the sensors may be in communication with a central processor or server of an event generator system that may receive information or data from such sensors, and provide such information or data (e.g., digital and/or analog data) to one or more other computing devices or resources that may be connected to the network 290, or for any other purpose. Alternatively, one or more of such sensors may be outfitted with processors and/or transceivers for independently transmitting or receiving information or data (e.g., digital and/or analog data) to or from one or more other computing devices or resources that may be connected to the network 290, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "camera," a "system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "camera," a "system," an "actor" (or "customer," or "user," or "worker," or "human operator") may be typically performed by a human, but could, alternatively, be performed by an automated agent.

The materials handling facility 210 (or any actors associated therewith) and/or the imaging devices 220-1, 220-2 . . . 220-n may use any web-enabled or Internet applications or features, any other client-server applications or features, or other messaging techniques, to connect to the network 290 or to communicate with one another. For example, the servers 212 may be adapted to transmit or receive information or data in the form of synchronous or asynchronous messages to or from the imaging devices 220-1, 220-2 . . . 220-n, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith) or the imaging devices 220-1, 220-2 . . . 220-n may include or operate any of a number of computing devices or resources that are capable of communicating over the network 290, including but not limited to set-top boxes, personal digital assistants, digital media players, mobile devices (e.g., smartphones), tablet computers, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 212, the data stores 214, the processor 216, the imaging devices 220-1, 220-2 . . . 220-n, the processor 234-i, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3A:
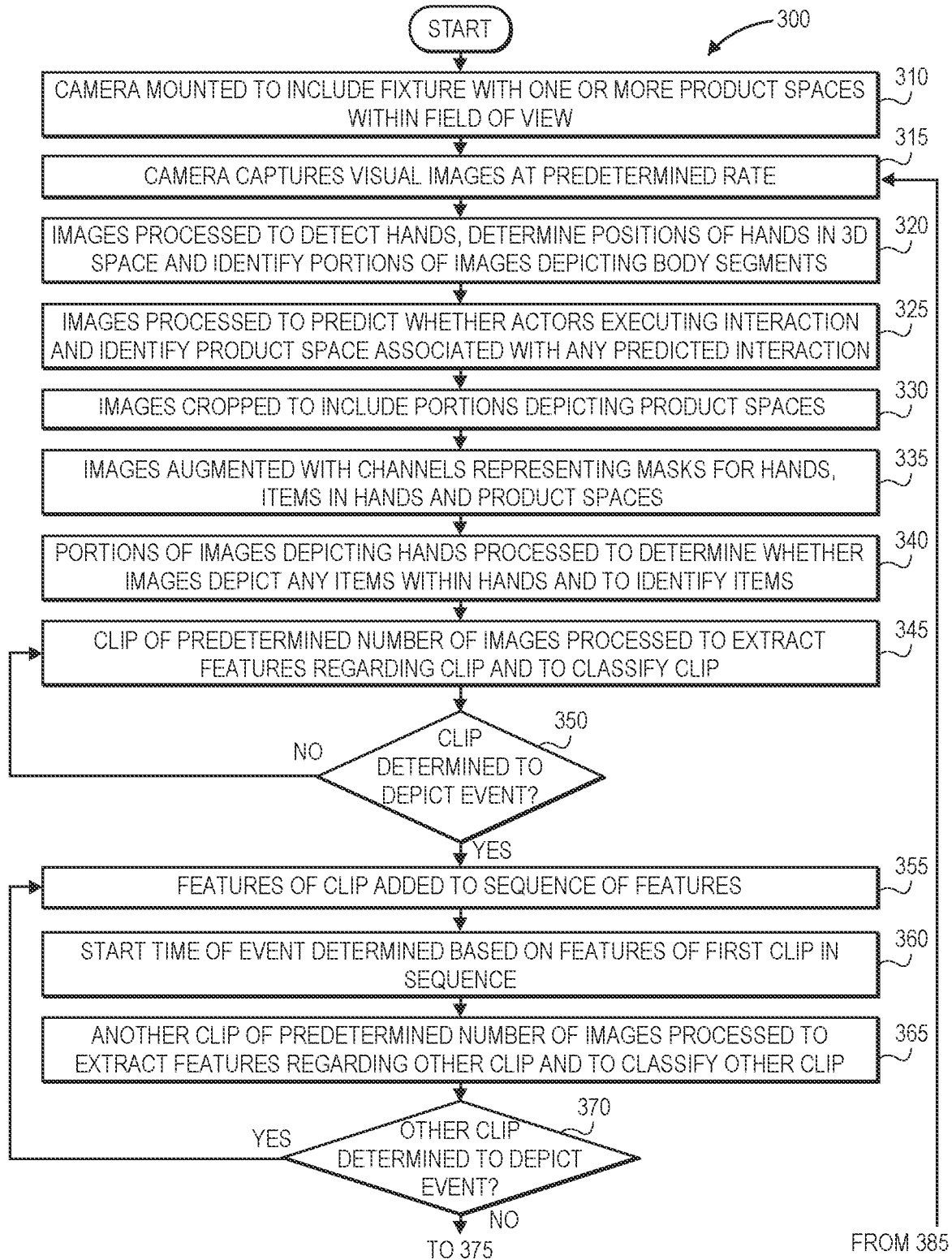
FIGS. 3A and 3B are a flow chart of one process for detecting events in accordance with implementations of the present disclosure.
Figure 3B:
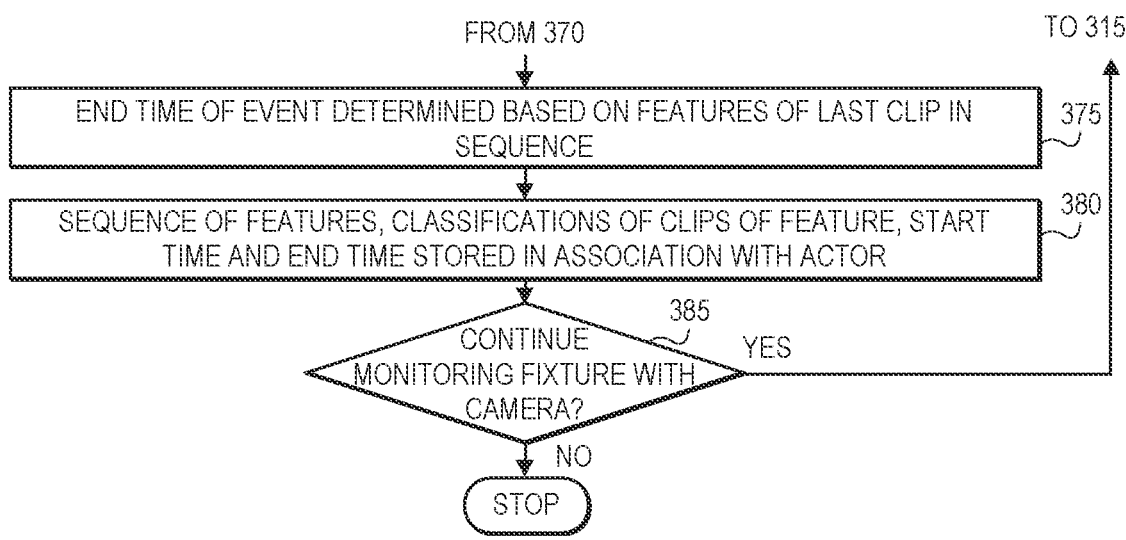

Referring to FIGS. 3A and 3B, a flow chart 300 of one process for detecting events in accordance with implementations of the present disclosure is shown. At box 310, a camera is mounted to include a fixture with one or more storage units within a field of view of the camera. For example, the fixture may be a physical structure for storing one or more items, or sets of items, thereon or therein. In some implementations, the fixture may include any number of storage units, e.g., sets or racks of shelves or platforms having items of various types or kinds provided in specific locations thereon, such as one or more lanes or other portions or sections of such shelves or other platforms. The fixture may be provided in a discrete location of a materials handling facility, such as along or adjacent to one or more walls, or independently within or near walking or traveling areas or spaces of the materials handling facility, e.g., on a table or another structure, or in a free-standing manner.

The camera may be one of a plurality of cameras provided within a materials handling facility. Each of the cameras may be aligned to include all or portions of one or more fixtures within their respective fields of view. Additionally, in some implementations, two or more cameras may include fields of view that overlap at least in part.

At box 315, the camera captures visual images at a predetermined rate, e.g., fifteen frames (or images) per second. Alternatively, the camera may be configured to capture visual images at frame rates of five, ten, twenty, thirty, sixty or any other number of frames (or images) per second. Additionally, the camera may also be configured to capture visual images at any level of resolution or pixel density. For example, in some implementations, the camera may be configured to capture high resolution images, such as images having resolutions or pixel densities of at least 300 pixels per inch (or ppi), or any other number of pixels per inch. Moreover, in some implementations, the camera may be configured to capture images of any size or dimensions.

At box 320, the images captured at box 315 are processed to detect hands, to determine positions of the hands in 3D space, and to identify portions of the images that depict body segments. In some implementations, one or more body parts such as heads, arms, hands, torsos or portions thereof may be detected within the visual images using a machine learning model that is trained to identify such body parts depicted within an image, such as a segmentation network.

For example, the camera may generate crops of the images or otherwise identify portions of the images depicting body parts. Moreover, where a hand is one of the body parts detected within the images, one or more processor units provided on or within the camera may generate or identify a bounding box or another portion of the visual image representing sets of pixels depicting the hand, or otherwise provide a point of reference for a location of the hand within the visual image. The portions of the visual images depicting hands may include a predetermined number of image pixels, or a variable number of image pixels, and may be identified by a bounding box or in any other manner.

In some implementations, the camera may be configured to execute a body part detection module (e.g., an algorithm, system or technique), which may be an artificial neural network, such as a convolutional neural network, or any other machine learning model, such as a segmentation network, that is trained to identify hands or other body parts depicted within an image. In some implementations, a body part detection module may generate a segmentation record identifying segments of an image depicting body parts and their respective locations within the image. In some implementations, a body part detection module may be configured to detect portions of a body part, including but not limited to multiple portions of the same body part, e.g., an upper arm and a lower arm.

In some implementations, the camera may be configured to determine positions of the body parts of each of the actors depicted within each of the visual images, e.g., in 3D space. In some implementations, one or more processor units provided on or within the camera may determine positions of such body parts based on a position of the camera, as well as any monocular cues or other attributes of the visual images or the body parts depicted therein. For example, the positions of the body parts in 3D space may be determined based on absolute or relative sizes of the body parts depicted within the visual images, or apparent elevations of the body parts within the visual images, e.g., with respect to floors or traveling surfaces, as well as any colors or textures of the body parts (or gradients of such colors or textures), relative motion of the body parts, or any other attributes of the body parts or the visual images.

In some implementations, positions of body parts of actors may be determined by different processes, e.g., according to two or more discrete algorithms, systems or techniques. Alternatively, in some implementations, maps of the body parts may be generated concurrently or together with the determination of the positions of such body parts in 3D space, e.g., by the same algorithms, systems or techniques, or by different algorithms, systems or techniques.

In some implementations, a locating module may be applied to consecutive images, or other sets of images (e.g., images captured at regular intervals of time, or images in a sequence), to track hands of actors or items within such hands from image to image over time. Alternatively, or additionally, in some implementations, locating data regarding positions and identities of actors within a vicinity of the fixture may be determined by or received from a tracking system or service operating within a materials handling facility, and may include approximate positions of any number of actors, as well as visual descriptors or other identifiers of such actors, or any other information or data regarding the actors. In some implementations, a locating system or service may execute one or more tracking or matching algorithms, e.g., a tracking-by-detection algorithm, or a bipartite matching algorithm, that generates a tracklet-to-detection assignment or a visual descriptors-to-detection assignment over consecutively captured data (e.g., consecutive visual images) in any manner. For example, if a trajectory or visual descriptors of a set of pixels identified in one image frame are not matched to a detection of a body part (e.g., a head), the trajectory or visual descriptors may be extended into a successively captured frame. In some implementations, the locating data may relate to a detection of a body part in one image, and a set of visual descriptors of pixels corresponding to the actor in a subsequent image frame. Moreover, in some implementations, the locating data may further include or reference images of one or more portions of each of such actors (e.g., images of body parts such as heads), as well as approximate positions of such portions of the actors, which may have been captured by one or more imaging devices or other sensors provided within the materials handling facility or from any other source. The locating data may also identify approximate positions of each of the actors, which may be represented in 3D space by a set of Cartesian coordinates, or coordinates according to any other system.

At box 325, the images are processed to generate a prediction as to whether each of the actors depicted therein is executing an interaction with one or more of the product spaces, and to identify such product spaces. For example, an interaction detection module (or another module, such as a deep network or another artificial neural network) may determine whether each of the images depicts a taking or picking event (or a retrieval) by an actor, a return or deposit event (or a placement) by the actor, no events by any actor (e.g., neither takings or pickings nor returns or deposits, or any retrievals or placements), or a multiple event (e.g., one or more takings or pickings and also one or more returns or deposits, or one or more retrievals and one or more placements) by the actor.

In some implementations, images may be processed in their entirety to detect hands, to determine positions of the hands in 3D space, or to identify portions of such images that depict one or more body segments, and the images need not be masked or cropped prior to processing. Likewise, in some implementations, images may be processed in their entirety to predict whether any actors depicted therein have executed interactions with one or more product spaces associated with the storage units, and the images need not be masked or cropped prior to processing.

At box 330, the images are cropped to include only portions depicting the product spaces, as well as portions of actors and any items therein, or to exclude one or more background features, e.g., portions within the field of view that do not depict a product space. For example, each of the images may be reoriented or reconfigured such that one of the product spaces is featured in a center of one of such images. Moreover, where an image includes two or more product spaces, the images may be copied two or more times and cropped as necessary, such that centers or centroids of such product spaces are each featured within one of the images.

At box 335, the images are augmented with channels representing masks for hands depicted within the images, masks for items within such hands, and masks for product spaces depicted within the images. For example, in some implementations, where the image is represented according to an RGB color model, the image may be augmented to include additional channels corresponding to one or more masks for hands, for products or items, and for product spaces.

At box 340, portions of the images depicting hands are processed to determine whether such images depict any items within such hands, or to identify such items. For example, in some implementations, where a hand is one of the body parts detected within visual images captured at box 315, one or more processor units provided on or within the camera may generate or identify a bounding box or another portion of the visual image representing sets of pixels depicting the hand, or otherwise provide a point of reference for a location of the hand within the visual image. The portions of the visual images depicting hands may include a predetermined number of image pixels, or a variable number of image pixels, and may be identified by a bounding box or in any other manner. Subsequently, or concurrently, the camera may determine a number of items and identities of items within hands depicted within the visual images. For example, a portion of a visual image represented within a bounding box or otherwise identified as including a hand may be processed by one or more processor units provided on or within the camera to determine whether the portion of the visual image depicts any items within the hand, or to identify any items within the hand, as well as a number of such items within the hand. The camera may then determine item-in-hand (or product-in-hand) annotations from the visual images. For example, for each of the portions of visual images that are determined to depict a hand, one or more processor units provided on or within the camera may annotate or otherwise label such portions to indicate whether the portions also depict any items within such hands, as well as to include identifiers of the items within such hands.

At box 345 a clip (or another set) of a predetermined number of the images is processed to extract a set of features regarding the clip therefrom, and to classify the clip. The set may include any number of images, e.g., eight, ten, fifteen, twenty or any other number of images, or images captured over any interval or period of time, e.g., one second, one-and-one-half seconds, or any other interval or period of time. The clip may include each of the images captured over the interval or period of time, or fewer than all of such images, e.g., every second, third, fourth or other multiple of such images in series.

In some implementations, the clip may be provided to a module or machine learning tool, such as a slow-fast model, or a dual-mode convolutional neural network, to extract the set of features regarding the clip. Such features may have any dimensions, and any number of digits or values in accordance with implementations of the present disclosure. Such digits or values may but need not be readily interpreted as representing any semantic attributes. Additionally, the clip may be provided to a machine learning model, such as a multi-layer perceptron model, to classify the clip as depicting a specific event, e.g., a taking or picking event, a return or deposit event, no event, or multiple events.

In some implementations, the images of the clip may be centered on portions of such images depicting product spaces, or cropped to include only such portions, prior to providing the images of the clip to the module or machine learning tool to extract the set of features.

At box 350, whether the clip processed at box 345 depicts an event, e.g., a taking or picking event, or a return or deposit event, or does not depict an event, is determined. If the clip is not classified as depicting an event, then the process returns to box 345, where another clip (or set) of a predetermined number of the images is processed to extract a set of features therefrom, and to classify the clip. In some implementations, the other clip (or set) of the predetermined number of images need not include any images that were previously processed to identify features or to classify the clip, such as where the respective clips are in series. For example, where each of the clips has a fixed duration or number of images, e.g., one second or fifteen images, the images of the respective clips may be in series, e.g., images captured in consecutive seconds. In some other implementations, however, the other clip of the predetermined number of images may include one or more images that were previously processed, e.g., where the clips overlap at least in part. For example, where each of the clips has a fixed duration or number of images, a duration of a next clip may include half of a duration of a previous clip, or a next clip may include half of the images of a previous clip, thereby ensuring that the next clip overlaps with the previous clip. Alternatively, clips may include any duration or any number of images in common with one another.

If the clip processed at box 345 is classified as depicting an event, then the process advances to box 355, where features regarding the clip are added to a sequence of features representing at least the event, and to box 360, where a start time of the event is determined based on a time associated with a first clip in the sequence, e.g., the clip processed at box 345. For example, the time associated with the clip processed at box 345 may be a time at which a first image of the clip was captured, a time at which a last image of the clip was captured, a time at which any other images of the clip were captured, or an average time associated with the clip.

At box 365, another clip (or set) of a predetermined number of the images is processed to extract a set of features regarding the clip therefrom, and to classify the clip. The clip processed at box 365 may include the same number of images included in the clip processed at box 345, or another number of images, and may be processed in the same manner as the clip processed at box 345, or in a different manner.

At box 370, whether the clip processed at box 365 is classified as depicting an event is determined. If the clip is classified as depicting an event, then the process returns to box 355, where features of the clip are added to the sequence of features.

If the clip is not classified as depicting an event, however, then the process advances to box 375, where an end time of the event is determined based on a time associated with features of a last clip in the sequence, e.g., the clip processed at box 365 or, alternatively, a previously processed clip. In some implementations, an end of the event may be determined only after a predetermined number of clips have been determined to not depict an event. Moreover, in some implementations, an end of an event may be determined after features of a predetermined number of clips have been added to the sequence at box 355, even if such clips continue to be classified as depicting events, e.g., to ensure that the sequence is not overly lengthy.

At box 380, the sequence of features, the classifications of each of the clips, the start time determined at box 360, and the end time determined at box 375, are stored in association with the actor, e.g., by a server or another computer system. At box 385, whether the monitoring of the fixture with the camera should continue is determined. If the monitoring should continue, then the process returns to box 315, where the camera captures visual images at the predetermined rate. If the monitoring of the fixture with the camera should not continue then the process ends. The server or other computer system may process the features, classifications and start and end time received from the camera, or from any other cameras, to generate a prediction or shopping hypothesis as to whether any interactions with the fixture by any actor has occurred, or for any other purpose. In some implementations, any information or data regarding items identified within such hands at box 340, e.g., numbers and identities of the items, may be provided to the server or other computer in parallel with the sequence of clips, the classifications, the start time and the end time, or separately. Alternatively, information or data regarding the items within such hands may be received from any other system, other than the camera that captured the visual images at box 315, or otherwise determined in any other manner.

Figure 4:
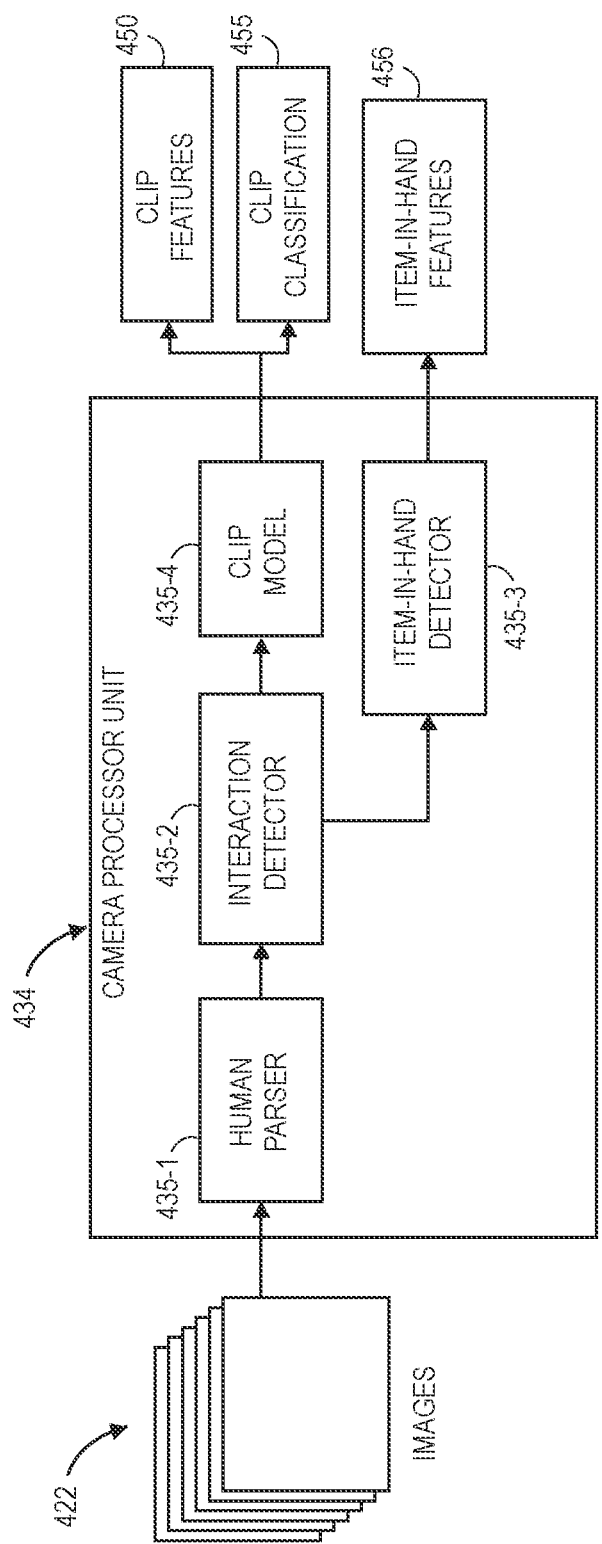
FIG. 4 is a flow diagram of components of one system for detecting events in accordance with implementations of the present disclosure.

As is discussed above, imaging devices of the present disclosure may be programmed or configured to capture images of one or more fixtures having one or more product spaces or other storage units as actors execute one or more poses, gestures or other actions associated with the fixture. The imaging devices may be further programmed or configured to mask or crop the images to include only a single actor and a single product space, and clips of such masked or cropped images may be processed to generate spatial-temporal features of such images, and to classify such clips with respect to whether the images likely depict an event.

Where consecutive clips of images are determined to depict an event, the features derived from the clips are combined into a sequence and transmitted, with the classifications and a start time and an end time of the event, to a server or other computer device or system for processing. Referring to FIG. 4, a flow diagram of one system for detecting events in accordance with implementations of the present disclosure are shown. Except where otherwise noted, reference numerals preceded by the number "4" shown in FIG. 4 indicate components or features that are similar to components or features having reference numerals preceded by the number "2" shown in FIG. 2A or 2B or by the number "1" shown in FIGS. 1A through 1L.

As is shown in FIG. 4, a clip of images 422 captured by a camera may be processed by a processor unit 434 of the camera to generate a set of features 450 regarding the images 422 of the clip, and a classification 455 of the clip, e.g., indicating whether the clip depicts a specific event of interest, or does not depict any event. The processor unit 434 may further process the images 422, or masked or cropped portions of the images 422, to determine whether any hands 456 depicted therein contain any items, or to identify such items.

The processor unit 434 may be configured to execute, or may include components for executing, one or more of the functions or applications described herein. As is shown in FIG. 4, the processor unit 434 may be configured to execute a human parser module (or agent) 435-1, as well as an interaction detection module (or agent) 435-2, an item-in-hand detection module or agent 435-3, and a clip model 435-4.

The human parser module 435-1 may be configured to process every image captured by a camera, or fewer than all of the images captured by the camera, to determine whether such images depict body parts of any actors, as well as to determine locations of such body parts within each image. The human parser module 435-1 may be a machine learning system, e.g., an artificial neural network, such as a convolutional neural network, that is trained to identify body part image segments (e.g., hands, heads, shoulders, upper arms, elbows, lower arms, wrists, feet, or other body parts) depicted within the images 422, such as a segmentation network. In some implementations, the human parser module 435-1 may generate, as an output in response to each of the images 422 as an input, a segmentation record identifying segments of the images 422 depicting body parts and their respective locations within the image. In some implementations, the human parser module 435-1 may further generate one or more sets of regression vectors or other associations between locations of pairs of body parts, such as heads and hands, detected within one or more of the images 422. The human parser module 435-1 may further determine 3D positions of each of the body parts detected within the images 422, based on a position of the camera, as well as any monocular cues or other attributes of the images 422 or the body parts depicted therein. For example, positions of the body parts in 3D space may be determined based on absolute or relative sizes of the body parts depicted within the images 422, or apparent elevations of the body parts within the images 422, e.g., with respect to floors or traveling surfaces, as well as any colors or textures of the body parts (or gradients of such colors or textures), relative motion of the body parts, or any other attributes of the body parts or the images 422.

The interaction detection module 435-2 may be configured to determine whether an actor has executed an interaction with a fixture or a product space of the fixture based on a map and/or positions of body parts of the actor generated by the human parser module 435-1, as well as any available information or data regarding geometric features of the fixture or the product spaces of the fixture, or any items provided thereon.

The item-in-hand detection module 435-3 may be configured to crop or otherwise isolate portions of the images 422 that are determined to depict hands, e.g., based on a map or other representation of positions of body parts of the actor, and to determine whether such portions of the images 422 depict any items within such hands. The item-in-hand detection module 435-3 may further generate any number of features 456 regarding items detected within such hands, e.g., counting features or identifiers of such items.

The clip model 435-4 may process a clip or a set of the images 422, in order to extract spatial-temporal features 450 regarding such images, and to predict whether such images depict an event that occurred at a time associated with the clip or set. In some implementations, the clip model 435-4 may be a machine learning model having a slow-fast model (e.g., a machine learning model having both "slow" and "fast" pathways), or a dual-model convolutional neural network, as a backbone. The clip model 435-4 may be further configured to generate a classification 455 of the clip, and to indicate whether images of the clip depict an event, e.g., a taking or picking event, a return or deposit event, or no event, by a multi-level perceptron network, or any other model.

Once the processor unit 434 has generated the clip features 450 and the clip classification 455 for each clip of the images 422, the processor unit 434 may provide such features 450 and the classification 455 to a server or another computer system over one or more networks.

Figure 5:
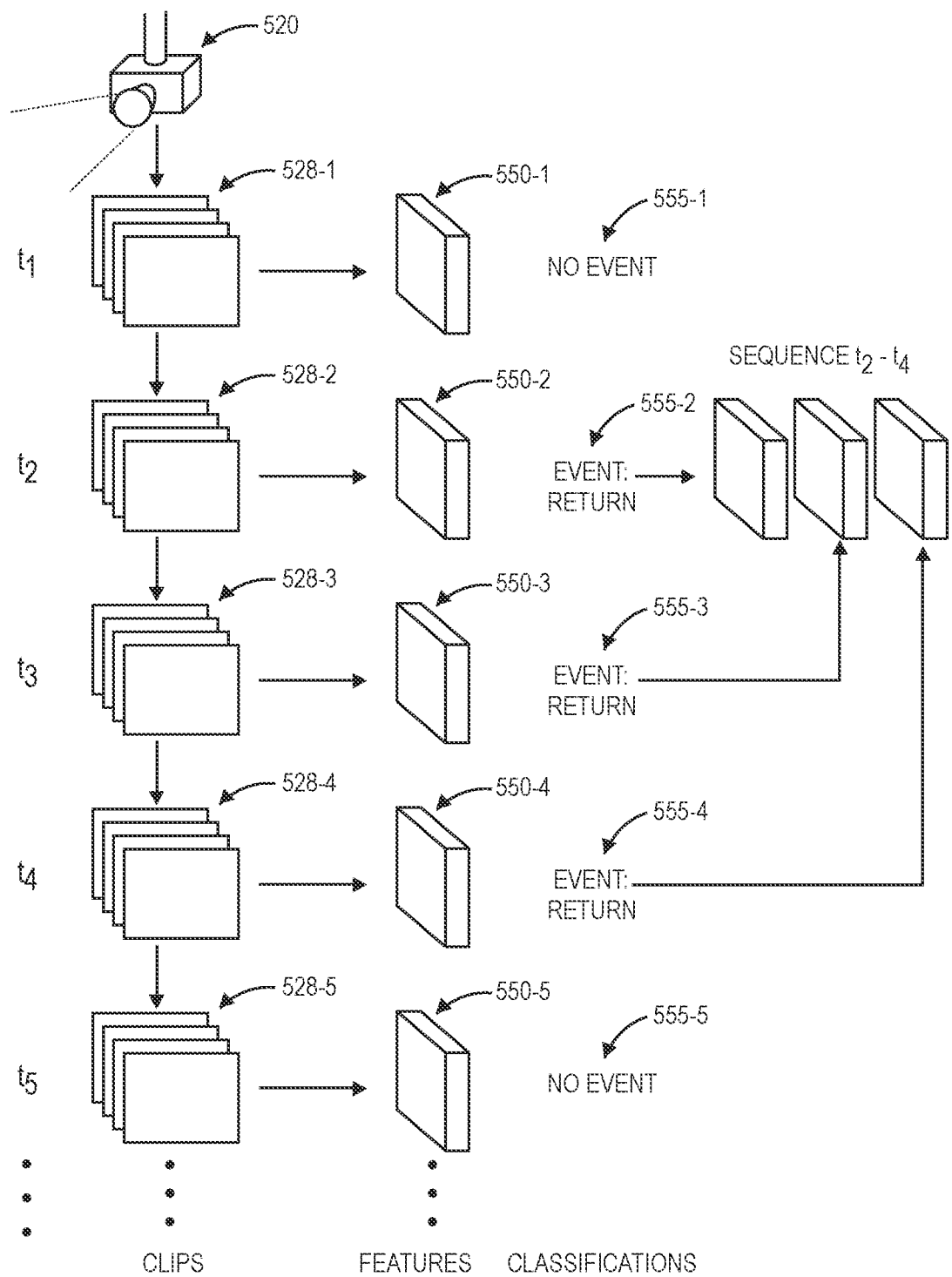
FIG. 5 is a view of aspects of one system for detecting events in accordance with implementations of the present disclosure.

A sequence of clips may be identified as depicting a common event, based on features determined regarding the images of such clips, and classifications of such clips. Referring to FIG. 5, a flow diagram of one system for detecting events in accordance with implementations of the present disclosure are shown. Except where otherwise noted, reference numerals preceded by the number "5" shown in FIG. 5 indicate components or features that are similar to components or features having reference numerals preceded by the number "4" shown in FIG. 4, by the number "2" shown in FIG. 2A or 2B or by the number "1" shown in FIGS. 1A through 1L.

As is shown in FIG. 5, a camera 520 may be configured to capture images of a scene, and to generate clips or sets of images that are captured over any duration of time or include any number of images, and have been masked or cropped to depict a single product space with respect to a single actor, and centered on the single product space. For example, as is shown in FIG. 5, a clip 528-1 generated from images captured at approximately a time $t_1$ may be processed to generate a set of features 550-1 of the images of the clip 528-1, and a classification 555-1 of the images of the clip 528-1, e.g., by providing the clip 528-1 to a clip model having a slow-fast backbone and a multi-layer perceptron network, or any other machine learning model. The time $t_1$ may be a time at which a single image of the clip 528-1 was captured, e.g., a first image, a last image, a middle image, or any other image of the clip 528-1, or an average time associated with images of the clip 528-1, or any other time. The clip 528-1 may be provided to the clip model after the images of the clip 528-1 have been captured and processed by masking or cropping and centering, e.g., at a rate defined by the number of images in the clip 528-1. For example, where the cameras 520 is configured to capture images at a rate of fifteen frames per second (fps), and the clip 528-1 includes fifteen images, clips of masked or cropped and centered images (e.g., the clip 528-1) may be provided to a clip model at a frequency of one Hertz (1 Hz), or a rate of one clip per second.

Based on the classification 555-1 of the clip 528-1, e.g., that the images of the clip 528-1 do not depict an event, information or data regarding the clip 528-1 (e.g., the features 550-1) need not be further considered in generating a shopping hypothesis for the actor depicted within the clip.

As is further shown in FIG. 5, a clip 528-2 of images generated from images captured at approximately time $t_2$ that have been masked or cropped to depict the product space, and centered on the product space. The images of the clip 528-2 are processed to generate a set of features 550-2, and to determine a classification 555-2 of the clip 528-2, by providing the images of the clip 528-2 to the clip model at a rate or a time defined by the number of images in the clip 528-2.

Because the classification 555-2 indicates that the images of the clip 528-2 depicted an event, e.g., a return event, a sequence of features representing the return event may be generated including the features 550-2 of the clip 528-2. A start time of the return event may be determined based on the time $t_2$ associated with the clip 528-2.

Subsequently, a clip 528-3 of images generated from images captured at approximately time $t_3$ that have been masked or cropped to depict the product space, and centered on the product space, is processed to generate a set of features 550-3, and to determine a classification 555-3 of the clip, by providing the clip 528-3 to the clip model at a rate or a time defined by the number of images in the clip 528-3. Because the classification 555-3 indicates that the images of the clip 528-3 depicted an event, e.g., a return event, the features 550-3 generated from the clip 528-3 may be added to the sequence of features that was initiated with the features 550-2 of the clip 528-2.

Likewise, a clip 528-4 of images generated from images captured at approximately time $t_4$ that have been masked or cropped to depict the product space, and centered on the product space, is processed to generate a set of features 550-4, and to determine a classification 555-4 of the clip, by providing the clip 528-4 to the clip model at a rate or a time defined by the number of images in the clip 528-4. Because the classification 555-4 indicates that the images of the clip 528-4 depicted an event, e.g., a return event, the features 550-4 generated from the clip 528-4 may be added to the sequence of features that was initiated with the features 550-2 of the clip 528-2, and augmented with the features 550-3 of the clip 528-3.

A clip 528-5 of images generated from images captured at approximately time is that have been masked or cropped to depict the product space, and centered on the product space, is processed to generate a set of features 550-5, and to determine a classification 555-5 of the clip, by providing the clip 528-5 to the clip model at a rate or a time defined by the number of images in the clip 528-5. Because the classification 555-5 indicates that the images of the clip 528-5 do not depict the event, the features 550-5 generated from the clip 528-5 need not be further considered in generating a shopping hypothesis. Moreover, and also based on the classification 555-5, the sequence of features that was initiated with the features 550-2 of the clip 528-2, and augmented with the features 550-3, 550-4 of the clips 528-3, 528-4, may be concluded and an end time of the event may be determined based on the time $t_4$ associated with the clip 528-4.

Figure 6:
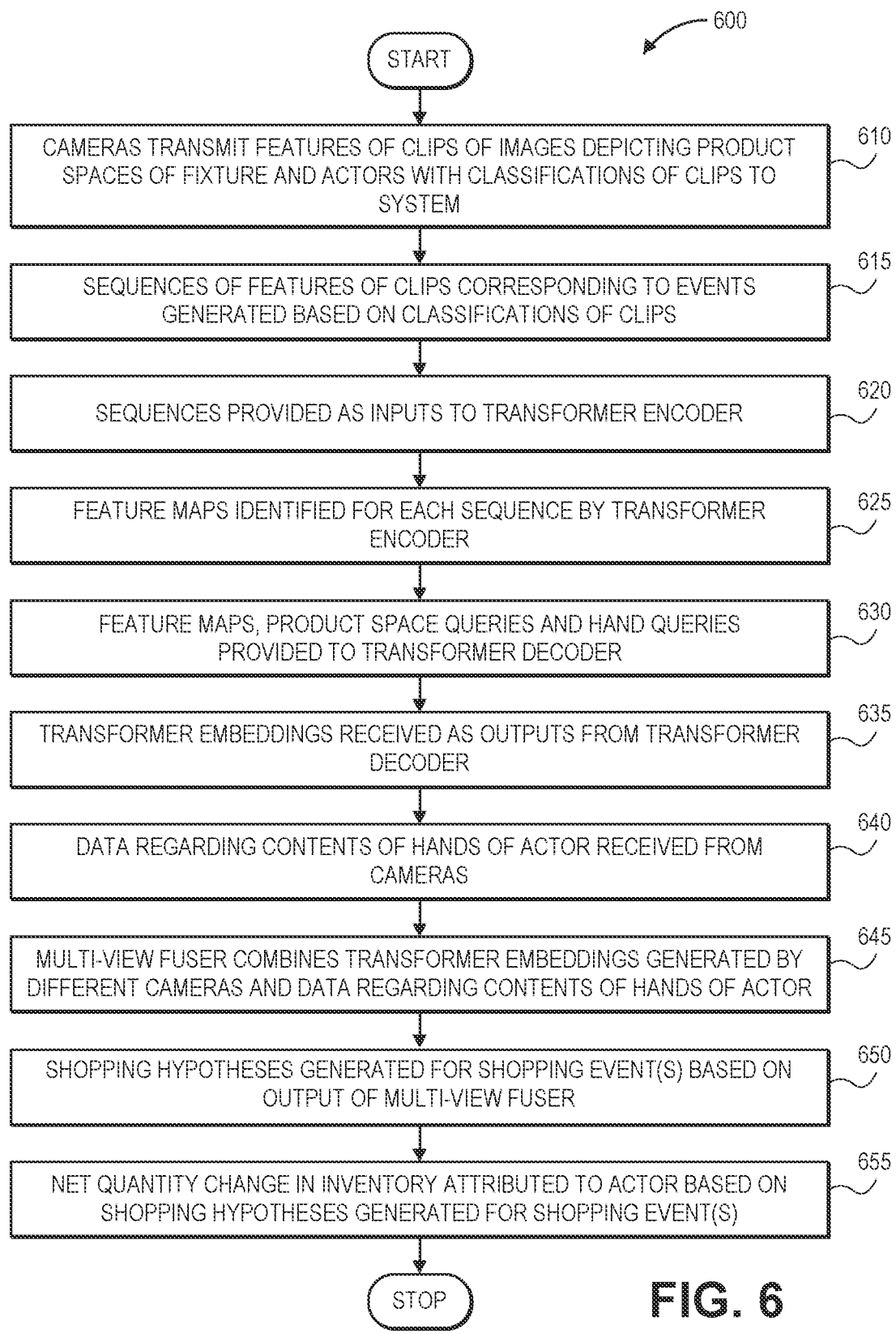
FIG. 6 is a flow chart of one process for detecting events in accordance with implementations of the present disclosure.

Referring to FIG. 6, a flow chart 600 of one process for detecting events in accordance with implementations of the present disclosure is shown. At box 610, cameras transmit features of clips of images depicting product spaces of a fixture and actors with classifications of the clips to a system in communication with each of the cameras. For example, each of the cameras may be visual cameras (e.g., RGB cameras) mounted above a materials handling facility that include one or more fixtures with sets of shelves or other storage units having items of various types or kinds provided in specific locations thereon. The cameras may be configured to capture imaging data (e.g., visual images) from fields of view that include the fixture, and any items thereon, and two or more of the cameras may have fields of view that overlap at least in part. The actors may perform one or more poses, gestures, movements or other interactions within the materials handling facility. The features may be spatial-temporal features that describe individual images of the clips, or the clips as a whole, and may have any dimensions or any number of digits or values, and such digits or values may but need not be readily interpreted as representing any semantic attributes.

In some implementations, the cameras may capture images at a constant frame rate, such as fifteen frames per second, or any other frame rate, and generate another set of images by masking and cropping the captured images to include only portions of the captured images depicting specific product spaces therein, or any actors interacting with such product spaces, and not any background features (e.g., clutter). The masked or cropped images may also be processed to detect hands within such images, to determine positions of the hands in 3D space, or to identify any other body parts depicted within such images, and to locate or track such body parts, or the actors, across multiple images. In some implementations, the cameras may further process the images to predict a likelihood that each of the images depicts an actor executing an interaction with any of the product spaces.

In some implementations, images captured by the camera may be masked, layered or stacked to include information or data regarding their respective contents, which may be incorporated into such images or data structures representing such images. For example, where each of the pixels of the images includes channels representing colors depicted at such pixels, e.g., values corresponding to colors red, green or blue, the image may also be augmented or otherwise modified to include channels representing contents of such images, such as channels indicating whether the pixel depicts a portion of a hand, a portion of a product (or item), or a portion of a product space. Such channels may be represented in a binary manner, e.g., that the pixel does or does not depict a portion of a hand, a product (or item) or a product space, or in any other manner.

Clips of images from which features are determined may be defined to include any number of images, e.g., eight, ten, fifteen, twenty, or more, or images captured over any period of any duration, e.g., one second, one-and-one-half seconds, or any other duration. In some implementations, each of the images in a clip may depict one of the product spaces of the fixture. The masked or cropped images may be modified, recentered or otherwise reconfigured to include the one of the product spaces in a central portion or area of an image. Alternatively, or additionally, all product spaces may be represented within individual images of a clip.

In some implementations, features of each of the clips may have been generated by providing one or more images of a clip as inputs to a module or machine learning tool, e.g., a slow-fast model, or a dual-mode convolutional neural network, to extract the set of features regarding the clip. Features of each of the clips may have any dimensions, and any number of digits or values in accordance with implementations of the present disclosure. Such digits or values may but need not be readily interpreted as representing any semantic attributes. Additionally, the clips may have been classified by providing one or more images of the clips to a machine learning model, such as a multi-layer perceptron model, to classify the clip as depicting a specific event, e.g., a taking or picking event, a return or deposit event, no event, or multiple events.

At box 615, sequences of the features of the clips corresponding to events are generated based on the classifications of the clips. For example, the classifications of the clips may indicate whether each of the clips depicts an event, e.g., a taking or picking event, or a return or deposit event, or does not depict an event. Where consecutive clips are classified as depicting an event, features of such clips may be added to a sequence corresponding to the event, with a start time of the event being determined based on a time associated with a first one of the clips to be classified as depicting the event, and an end time of the event being determined based on a time associated with a last one of the clips to be classified as depicting the event, or on any other basis. The sequences may be generated by providing the features of the respective clips.

At box 620, the sequences generated at box 615 are provided as inputs to a transformer encoder. In some implementations, the transformer encoder may have any number of layers, each having a standard architecture consisting of a multi-head self-attention module, and a feedforward network.

At box 625, feature maps are identified for each of the sequences by the transformer encoder. In some implementations, the transformer encoder may model similarities with respect to each of the clip-level features within the sequences, which may have a common set of dimensions. The sets of features of a given sequence may be encoded or concatenated and flattened into a single dimension, resulting in a feature map having a size defined by the number of clips in the sequence and the dimensions of each of the sets of features.

At box 630, the feature maps identified at box 625 are provided to a transformer decoder along with product space queries and hand queries. The product space queries (or lane queries, or any other query representing any other storage unit or aspect of the fixture that may accommodate one or more items thereon) may represent an action that may occur at one of the product spaces of the fixture. The hand queries represent positions of the hands within such images. Based on the feature maps generated by the transformer encoder, and the product space queries and hand queries, the transformer decoder generates a set of product space-specific action features that may be encoded into a set of labels by a feedforward network, including one label for each of the product spaces.

At box 635, transformer embeddings are received as outputs from the transformer decoder. The transformer embeddings may represent predictions, e.g., one transformer embedding for each product space, of an event that occurred at each of the product spaces, during a period of time corresponding to one of the sequences generated from the clips of images. Such predictions may include a likelihood, a probability or another qualitative or quantitative measure that a taking event, a return event or no action or event occurred at each of the product spaces.

At box 640, data regarding contents of the hands of the actor during periods of time associated with the sequences is received from the cameras. For example, in some implementations, images of the clips from which the sequences were generated may be cropped around portions of such images depicting the hands, and the cropped portions of such images may be processed to determine whether the hands contain any items, or to identify items within such hands. In some implementations, the data may include a score or a set of scores, such as a confidence score or another metric, indicating a similarity of each of such cropped portions to items associated with product spaces potentially associated with positions of the hands.

Data regarding the contents of the hands of the actor may be determined based on images captured by any camera including the actor within a field of view, and need not necessarily be determined based on images captured by a camera that captured images of one or more clips from which a sequence is generated. For example, one field of view of one camera may be more favorable for detecting body parts or movements of actors, and another field of view of another camera may be more favorable for detecting items depicted within hands of such actors, or identifying such items. Alternatively, or additionally, contents of hands of the actor may be determined in any other manner.

At box 645, a multi-view fuser combines transformer embeddings generated by different cameras and data regarding contents of the hands of the actor. For example, a multi-view fuser (or fusing module) may aggregate transformer embeddings generated by multiple cameras for a unique product space, and receive data regarding contents of hands (e.g., scores for items in the unique product space). In some implementations, the transformer embeddings may be provided to one machine learning model (e.g., a multi-layer perceptron model) as an input, and the data regarding the contents of the hands may be provided to another machine learning model (e.g., another multi-layer perceptron model) as an input.

At box 650, one or more shopping hypotheses are generated for one or more shopping events based on the output received from the multi-view fuser. For example, one or more outputs received from the multi-view fuser may be processed, e.g., by another machine learning model, to generate a final prediction based on sequences of features received from all of the cameras and processed by the transformer encoder and transformer decoder.

At box 655, a net quantity change in inventory at the materials handling facility is predicted based on the shopping hypotheses, and the process ends. In some implementations, a causal transformer decoder or another model may operate, e.g., in a forward continuous manner, and aggregate all events performed in association with a fixture through causal attention to predict the net quantity change. Alternatively, the net quantity change may be predicted in any other manner based on the shopping hypotheses.

Figure 7:
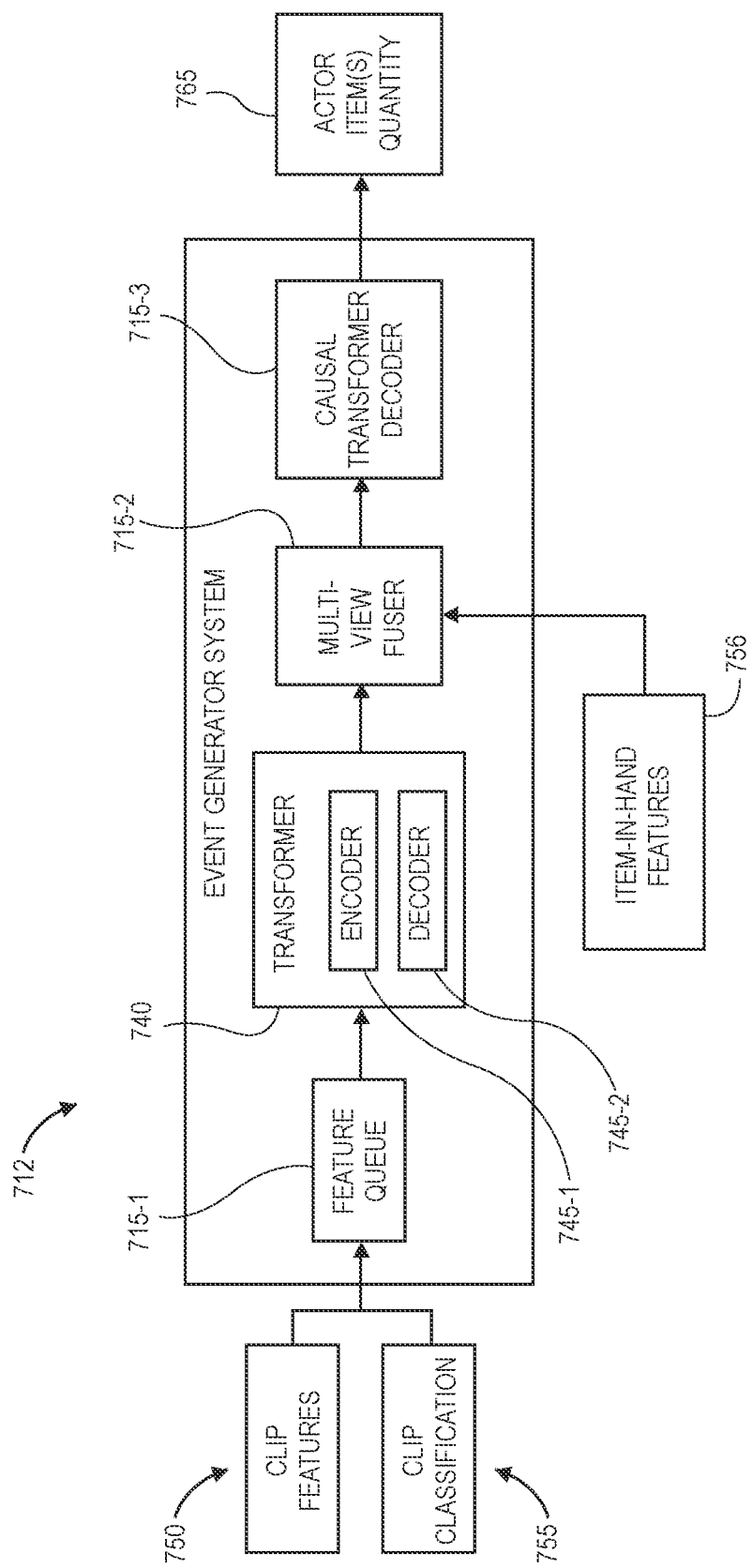
FIG. 7 is a flow diagram of components of one system for detecting events in accordance with implementations of the present disclosure.

Referring to FIG. 7, a flow diagram of one system for detecting events in accordance with implementations of the present disclosure are shown. Except where otherwise noted, reference numerals preceded by the number "7" shown in FIG. 7 indicate components or features that are similar to components or features having reference numerals preceded by the number "5" shown in FIG. 5, by the number "4" shown in FIG. 4, by the number "2" shown in FIG. 2A or 2B or by the number "1" shown in FIGS. 1A through 1L.

As is shown in FIG. 7, a plurality of clip features 750 and clip classifications 755 generated by a camera based on clips of images captured by the camera are provided to an event generator system 712 over one or more networks or directly. The event generator system 712 may be operated on a server or another computer device or system in communication with one or more cameras (not shown).

The event generator system 712 may be configured to execute, or may include components for executing, one or more of the functions or applications described herein. As is shown in FIG. 7, the event generator system 712 may be configured to execute a feature queue module (or agent) 715-1, a transformer 740 having an encoder 745-1 and a decoder 745-2, a multi-view fuser module (or agent) 715-2 and a causal transformer decoder 715-3.

The feature queue module 715-1 may be configured to generate a sequence of features for each candidate product space depicted within the clips from which the clip features 750 and the clip classifications 755 were generated. For example, where clip classifications 755 for a predetermined number of clips of images indicate that such clips depict an event, clip features 750 generated for such clips may be combined into a sequence of features, with a start time of the event being determined based on a first one of the clip features 750 identified as depicting the event. An end to a sequence of clip features 750 may be identified where one or more of the sets of clip features 750 is classified as not depicting the event, or after a predetermined number of the clip features 750 are added to the sequence (e.g., at a maximum length of the sequence). A sequence of the clip features 750 determined by the feature queue module 715-1 may thus represent one spatial-temporal representation of one potential event. An end time of the event may be determined based on a last one of the clip features 750 identified as depicting the event, or a last one of the clip features 750 in a sequence.

In some implementations, the clip features 750 may be generated by cameras for each of the product spaces present within their respective fields of view. In some other implementations, however, a likelihood or probability that images depict an event occurring by an actor at each of the product spaces may be calculated, and clip features 750 may be generated by and received from cameras for product spaces having likelihoods or probabilities in excess of a predetermined threshold, or for product spaces that are selected on any other basis.

The transformer 740 may be configured to generate multiple pairs of event type (e.g., taking or picking events, return or deposit events, or no events) and event locations (e.g., product spaces identified as associated with the events). The transformer 740 may use self-attention and encoder-decoder attention over feature embeddings (e.g., the clip features 750) and positional embeddings to consider all actions and product spaces together, and to interpret an entire sequence of features in context. For example, in some implementations, the encoder 745-1 of the transformer 740 may model similarities over all of the clip features 750 of a common sequence. The encoder 745-1 may concatenate each of the clip features 750 of a sequence and flatten the spatial and temporal dimensions of the concatenated clip features 750 to generate a feature map having a size defined by dimensions of the clip features 750 and a number of the sets of clip features 750 in the sequence. In some implementations, the encoder 745-1 may have a plurality of layers, each with a standard architecture including a multi-head self-attention module and a feedforward network. Alternatively, the encoder 745-1 may have any other architecture.

The decoder 745-2 of the transformer 740 is configured to receive outputs from the encoder 745-1, in the form of two-dimensional feature maps, and a plurality of positional embeddings, e.g., product space queries, or lane queries, or other queries. Based on the feature maps and the positional embeddings, as well as positions of each of the hands of actors represented in the sequence, the decoder 745-2 generates location-specific event features for each of the product spaces, and decodes such event features into classification labels, e.g., a taking or picking event from a first product space, or a return or deposit event at a second product space. Alternatively, or additionally, another query may represent a quantity of items associated with each of the represented events.

The multi-view fuser 715-2 may be configured to aggregate embeddings generated by the transformer 740 and item-in-hand features 756 received from one or more cameras to generate a shopping hypothesis. For example, in some implementations, the multi-view fuser 715-2 may include a first machine learning model (e.g., a multi-layer perceptron network) configured to process all transformer embeddings generated based on sequences of features of clips received from all cameras for a given product space, and a second machine learning model (e.g., another multi-layer perceptron network) configured to process all item-in-hand features 756 received from cameras including that product space within their respective fields of view. Outputs received from such models may be processed by another machine learning model (e.g., another multi-layer perceptron network) to generate a hypothesis (e.g., a shopping hypothesis).

The causal transformer decoder 715-3 may be configured to determine a net change 765 in inventory based on hypotheses derived from multiple events. A record of the net change 765 in inventory may include an identifier of the actor and of any items, as well as quantities of such items, and may be associated with the actor where the net change 765 is predicted with a sufficiently high level of confidence.

Referring to FIG. 8, a view of aspects of one system for detecting events in accordance with implementations of the present disclosure is shown. Except where otherwise noted, reference numerals preceded by the number "8" shown in FIG. 8 indicate components or features that are similar to components or features having reference numerals preceded by the number "7" shown in FIG. 7, by the number "5" shown in FIG. 5, by the number "4" shown in FIG. 4, by the number "2" shown in FIG. 2A or 2B or by the number "1" shown in FIGS. 1A through 1L.

As is shown in FIG. 8, a server 812 executing a transformer 840 of the present disclosure receives sequences 850-1, 850-2 . . . 850-n of features from a plurality of cameras 820-1, 820-2 . . . 820-n. Each of the cameras 820-1, 820-2 . . . 820-n may capture images of a fixture having one or more product spaces, and mask or crop the images to include only specific product spaces, and generate clips of the images. The sequences 850-1, 850-2 . . . 850-n may include features of clips of images that are determined to depict a specific event. Additionally, each of the cameras 820-1, 820-2 . . . 820-n may further crop portions of the respective images that depict hands, and process the cropped portions of such images using one or more machine learning models (e.g., deep networks) to generate item-in-hand features 856.

As is further shown in FIG. 8, the server 812 may execute the transformer 840 to receive the sequences 850-1, 850-2 . . . 850-n and to generate a prediction or a hypothesis, or a net change 865 in inventory associated with an actor, based on outputs (e.g., embeddings) received from the transformer 840. Information regarding the net change 865 in inventory may be stored in association with the actor and, in some implementations, transmitted to a device 885 associated with the actor. For example, the transformer 840 may include an encoder configured to generate feature maps from the sequences 850-1, 850-2 . . . 850-n received from the cameras 820-1, 820-2 . . . 820-n and a decoder configured to generate embeddings representing predictions as to events occurring at each of the product spaces represented in the sequences. The server 812 may further fuse transformer embeddings received from multiple cameras, and item-in-hand features 856 received from the multiple cameras, to generate shopping hypotheses from which the net change 865 in inventory may be predicted.

Although some of the implementations disclosed herein reference the detection of events, or the association of events with one or more actors based on images captured using one or more cameras, the systems and methods of the present disclosure are not so limited. Furthermore, although some of the implementations disclosed herein reference detecting events in a commercial setting, e.g., within a materials handling facility such as a fulfillment center or a retail establishment, the systems and methods of the present disclosure are likewise not so limited. Rather, the systems and methods disclosed herein may be utilized to detect events of any type or kind. Additionally, although some of the implementations described herein or shown in the accompanying figures refer to the processing of visual imaging data that is in color, e.g., according to an RGB color model, the systems and methods disclosed herein are not so limited, and may be used to process any type of information or data that is provided in color according to any color model, or in black-and-white or grayscale.

Moreover, any of the systems or methods disclosed herein may be utilized as a primary technique or means, or as an exclusive technique or means, for detecting events, or associating the events with actors based on imaging data captured using one or more cameras or other imaging devices. Alternatively, any of the systems and methods disclosed herein may be utilized as a secondary technique or means, or as an alternate or backup technique or means, for detecting events, or associating the events with actors. For example, those of ordinary skill in the pertinent arts will recognize that any of the systems and methods disclosed herein may be utilized in connection with, or in support of, any other technique or means for detecting events, or associating events with actors.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3A and 3B or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer system comprising at least one processor and at least one data store,
wherein the computer system is in communication with a plurality of cameras, and
wherein the computer system is programmed with one or more sets of instructions that, when executed by the at least one processor, cause the computer system to execute a method comprising:
receiving a first sequence of spatial-temporal features from a first camera of the plurality of cameras, wherein the first sequence of spatial-temporal features comprises a first set of spatial-temporal features generated by the first camera based on a first clip of images captured by the first camera and a second set of spatial-temporal features generated by the first camera based on a second clip of images captured by the first camera, wherein each of the images of the first clip is a multi-channel image including, for each pixel of such images, a plurality of channels corresponding to color values, a channel corresponding to a mask for a hand, a channel corresponding to a mask for a product and a channel corresponding to a mask for a product space, wherein each of the images of the second clip is a multi-channel image including, for each pixel of such images, a plurality of channels corresponding to color values, a channel corresponding to a mask for a hand, a channel corresponding to a mask for a product and a channel corresponding to a mask for a product space, and wherein each of the first clip and the second clip has been classified as depicting at least one event at the product space;
receiving a second sequence of spatial-temporal features from a second camera of the plurality of cameras, wherein the second sequence of spatial-temporal features comprises a third set of spatial-temporal features generated by the second camera based on a third clip of images captured by the second camera and a fourth set of spatial-temporal features generated by the second camera based on a fourth clip of images captured by the second camera, wherein each of the images of the third clip is a multi-channel image including, for each pixel of such images, a plurality of channels corresponding to color values, a channel corresponding to a mask for a hand, a channel corresponding to a mask for a product and a channel corresponding to a mask for a product space, wherein each of the images of the fourth clip is a multi-channel image including, for each pixel of such images, a plurality of channels corresponding to color values, a channel corresponding to a mask for a hand, a channel corresponding to a mask for a product and a channel corresponding to a mask for a product space, and wherein each of the third clip and the fourth clip has been classified as depicting at least one event at the product space;

providing each of the first sequence of spatial-temporal features and the second sequence of spatial-temporal features as inputs to a transformer executed by the computer system, wherein the transformer comprises:
    a transformer encoder having at least one layer configured to generate a feature map based at least in part on a sequence of spatial-temporal features derived from clips of images, wherein the at least one layer of the transformer encoder has a multi-head self-attention module and a feedforward network; and
    a transformer decoder configured to generate a hypothesis of a type of an event and a location of the event based at least in part on a feature map and a plurality of positional embeddings, wherein each of the positional embeddings corresponds to one of a plurality of product spaces;
receiving outputs from the transformer in response to the inputs;
determining that an actor executed at least one of a taking event, a return event or an event that is neither the taking event nor the return event with an item associated with the product space based at least in part on the outputs received from the transformer in response to the inputs; and
storing information regarding the at least one of the taking event, the return event or the event that is neither the taking event nor the return event in association with the actor in the at least one data store.

2. The computer system of claim 1, wherein each of the first set of spatial-temporal features is generated by providing the first clip of images as inputs to a first machine learning model executed by the first camera, wherein the first machine learning model comprises a dual-model convolutional neural network backbone and a multi-level perceptron network, and wherein the first machine learning model is configured to generate spatial-temporal features of a clip of images with respect to an actor and a product space and to classify the clip of images as being associated with a taking event, a return event or an event that is neither the taking event nor the return event,
    wherein each of the second set of spatial-temporal features is generated by providing the second clip of images as inputs to the first machine learning model, and
    wherein the first sequence of spatial-temporal features is generated in response to classifying the first clip of images as depicting the at least one event at the product space based at least in part on outputs received from the first machine learning model in response to the first clip of images as inputs and classifying the second clip of images as depicting the at least one event at the product space based at least in part on outputs received from the second machine learning model in response to the second clip of images as inputs.

3. A method comprising:
capturing at least a plurality of images by a first camera having a first field of view, wherein at least a portion of a fixture having a plurality of product spaces is within the first field of view, and wherein each of the plurality of images is captured over a period of time;
generating a first clip of the plurality of images, wherein the first clip comprises portions of each of the plurality of images depicting a first product space of the fixture captured over a first subset of the period of time;
generating a first set of features from the first clip of the plurality of images, wherein each of the first set of features corresponds to a first actor and the first product space;
classifying the first clip of the first plurality of images in one of a plurality of classifications, wherein the plurality of classifications comprises:
    a first classification of a taking event by the first actor;
    a second classification of a return event by the first actor; and
    a third classification of no event by the first actor;
generating a first sequence of features comprising the first set of features;
providing at least the first sequence of features as a first input to a first machine learning model trained to generate a hypothesis regarding an event type, an actor and an event location based on features of images;
receiving a first output from the first machine learning model in response to the first input; and
determining a hypothesis that the first actor executed at least one of a taking event associated with the first product space, a return event associated with the first product space or no event associated with the first product space based at least in part on the first output.

4. The method of claim 3, wherein the first machine learning model is a transformer comprising:
    a transformer encoder having at least one layer configured to generate a feature map based at least in part on a sequence of features derived from clips, wherein the feature map has dimensions determined based at least in part on a number of features derived from clips in the sequence and dimensions of each of the sets of features in the sequence, and wherein the at least one layer of the transformer encoder has a multi-head self-attention module and a feedforward network; and
    a transformer decoder configured to receive a feature map and a plurality of positional embeddings, wherein each of the plurality of positional embeddings corresponds to one of a plurality of product spaces, and wherein the transformer decoder is further configured to generate the hypothesis regarding the event type, the actor and the event location based at least in part on the feature map and the plurality of positional embeddings.

5. The method of claim 3, wherein the portions of each of the plurality of images comprise a plurality of pixels,
    wherein each of the portions comprises a plurality of channels for each of the plurality of pixels, and
    wherein the plurality of channels comprises:
        at least one channel corresponding to a color of one of the pixels;
        a channel indicating whether the one of the pixels depicts a portion of a hand;
        a channel indicating whether the one of the pixels depicts a portion of an item; and
        a channel indicating whether the one of the pixels depicts a portion of a product space.

6. The method of claim 3, further comprising:
generating a second clip of the plurality of images, wherein the second clip comprises portions of the plurality of images depicting the first product space of the fixture and at least a portion of the first actor captured over a second subset of the period of time;
generating a second set of features from the second clip of the plurality of images, wherein each of the second set of features corresponds to the first actor and the first product space;

classifying the second clip of the plurality of images in one of the plurality of classifications; and adding the second set of features to the first sequence of features, wherein the first sequence of features comprises at least the first set of features and the second set of features when the first sequence of features is provided as the first input to the first machine learning model.

7. The method of claim 6, further comprising:

determining that a start time of the event is a time associated with the first clip; and determining that an end time of the event is a time associated with the second clip.

8. The method of claim 6, further comprising:

generating a third clip of the plurality of images, wherein the third clip comprises portions of the plurality of images depicting the first product space of the fixture and at least a portion of the first actor captured over a third subset of the period of time;

generating a third set of features from the third clip of the plurality of images, wherein each of the third set of features corresponds to the first actor and the first product space;

classifying the third clip of the plurality of images in one of the plurality of classifications; and determining that the third clip has the third classification, wherein the first sequence of features is provided as the first input to the first machine learning model in response to determining that the third clip has the third classification.

9. The method of claim 3, wherein generating the first clip of the plurality of images comprises:

cropping each of the plurality of images captured over the first subset of the period of time to include the portions of each of the plurality of images depicting the first product space and at least one portion of the first actor, wherein the first clip of the plurality of images comprises the portions of each of the plurality of images captured over the first subset of the period of time centered on the first product space;

determining, for each pixel of the portions of each of the plurality of images, whether a pixel depicts a portion of a hand, a portion of an item or a portion of a product space; and storing, for each pixel of the portions of each of the plurality of images,
  a value indicating whether the pixel depicts the portion of the hand;
  a value indicating whether the pixel depicts the portion of the item; and
  a value indicating whether the pixel depicts the portion of the product space.

10. The method of claim 3, further comprising:

providing the first clip of the plurality of images as second inputs to a second machine learning model comprising a dual-model convolutional neural network backbone and a multi-level perceptron network, wherein the first set of features is generated and the first clip is classified based at least in part on second outputs received from the second machine learning tool in response to the second inputs.

11. The method of claim 3, further comprising:

generating a second sequence of features comprising a second set of features received from a second camera having a second field of view, wherein at least a portion of the fixture is within the second field of view, wherein the second set of features is generated from a second clip of images captured by the second camera over the period of time, and wherein each of the second set of features corresponds to the first actor and one of the first product space or a second product space of the fixture;

providing at least the second sequence of features as a second input to the first machine learning model; and receiving a second output from the first machine learning model in response to the second input, wherein the hypothesis is determined based at least in part on the first output and the second output.

12. The method of claim 3, further comprising:

processing each of the plurality of images to determine a probability that the first actor executed an event with each of the product spaces of the fixture; and identifying one of the product spaces of the fixture having the greatest probability, wherein the first product space is the one of the product spaces of the fixture having the greatest probability.

13. The method of claim 3, further comprising:

providing at least some of the plurality of images as inputs to a second machine learning model executed by the first camera; and generating maps of a plurality of body parts of the first actor depicted within the at least some of the plurality of images based at least in part on outputs received from the second machine learning model in response to the inputs, wherein the portions of each of the plurality of images depicting the first product space are stacked with at least one of:
  locations of the at least some of the plurality of body parts of the first actor within each of the images determined based at least in part on the maps; or
  positions of the at least some of the plurality of body parts of the first actor in three-dimensional space determined based at least in part on the maps.

14. The method of claim 3, wherein the plurality of images is captured at a rate of fifteen frames per second; and wherein the first clip of the plurality of images includes at least some of the plurality of images captured over one second.

15. The method of claim 3, further comprising:

identifying portions of images depicting at least one hand of the first actor, wherein each of the portions of images was captured by one of the first camera or a second camera having a second field of view, wherein at least a portion of the fixture having a plurality of product spaces is within the second field of view; and generating, for each of the portions, a score representing at least one of an item in the at least one hand or a number of the item in the at least one hand, wherein the hypothesis is generated based at least in part on the score.

16. The method of claim 3, further comprising:

predicting a change in inventory of items on the fixture based at least in part on the hypothesis; and storing information regarding the change in inventory of items in association with the first actor in at least one data store.

17. A materials handling facility comprising:

a fixture, wherein the fixture comprises a first product space and a second product space, wherein a plurality of items of a first type is provided on the first product space and a plurality of items of a second type is provided on the second product space;

a first camera having a first field of view, wherein the first field of view includes at least a portion of the first product space and at least a portion of the second product space, and wherein the first camera comprises a first processor unit and a first optical sensor; and a computer system in communication with at least the first camera, wherein the first camera is programmed with one or more sets of instructions that, when executed by the first processor unit, cause the first camera to perform a first method comprising:

capturing a first plurality of images, wherein each of the first plurality of images is captured at a fixed rate;

processing the first plurality of images to detect body parts of a first actor therein, wherein the detected body parts comprise a hand of the first actor;

providing a first set of clips of the first plurality of images as first inputs to a first machine learning model executed by the first camera, wherein each of the first set of clips comprises first portions of the first plurality of images captured over a predetermined duration, wherein pixels of each of the first portions comprise:

a first channel corresponding to a color red of a pixel;

a second channel corresponding to a color green of the pixel;

a third channel corresponding to a color blue of the pixel;

a fourth channel indicating whether the pixel depicts a hand;

a fifth channel indicating whether the pixel depicts an item; and a sixth channel indicating whether the pixel depicts a product space, and wherein the first machine learning model is configured to generate spatial-temporal features of a clip of images with respect to an actor and a product space and to classify the clip of images as depicting at least one event at the product space or not depicting any event at the product space;

providing a second set of clips of the first plurality of images as second inputs to the first machine learning model, wherein each of the second set of clips comprises second portions of the first plurality of images captured over a predetermined duration, and wherein pixels of each of the second portions comprise:

a first channel corresponding to a color red of a pixel;

a second channel corresponding to a color green of the pixel;

a third channel corresponding to a color blue of the pixel;

a fourth channel indicating whether the pixel depicts a hand;

a fifth channel indicating whether the pixel depicts an item; and a sixth channel indicating whether the pixel depicts a product space, determining that at least some of the first set of clips are classified as depicting at least one event based at least in part on first outputs received from the first machine learning model in response to the first inputs;

determining that at least some of the second set of clips are classified as depicting at least one event based at least in part on second outputs received from the first machine learning model in response to the second inputs;

transmitting a first sequence of spatial-temporal features to the computer system, wherein each of the first sequence of spatial-temporal features is generated for one of the at least some of the first set of clips; and transmitting a second sequence of spatial-temporal features to the computer system, wherein each of the second sequence of spatial-temporal features is generated for one of the at least some of the second set of clips; and wherein the computer system is programmed with one or more sets of instructions that, when executed, cause the computer system to perform a second method comprising:

providing at least the first sequence and the second sequence as inputs to a transformer executed by the computer system, wherein the transformer comprises:

a transformer encoder having at least one layer configured to generate a feature map based at least in part on a sequence of spatial-temporal features derived from clips of images, wherein the feature map has dimensions determined based at least in part on a number of spatial-temporal features derived from clips in the sequence and dimensions of each of the spatial-temporal features in the sequence, and wherein the at least one layer of the transformer encoder has a multi-head self-attention module and a feedforward network; and a transformer decoder configured to generate a hypothesis of a type of an event and a location of the event based at least in part on a feature map and a plurality of positional embeddings, wherein each of the positional embeddings corresponds to one of a plurality of product spaces;

receiving outputs from the transformer in response to the inputs;

determining that the first actor executed at least one of a taking event, a return event or no event with one of the first product space or the second product space based at least in part on the outputs received from the transformer in response to the inputs; and storing information regarding the at least one of the taking event, the return event or the no event in association with the first actor in at least one data store.

18. The materials handling facility of claim 17, further comprising:

a second camera having a second field of view, wherein the second field of view includes at least the portion of the first product space and at least the portion of the second product space, wherein the second camera comprises a second processor unit and a second optical sensor, and wherein the second camera is programmed with one or more sets of instructions that, when executed by the second processor unit, cause the second camera to perform a third method comprising:

capturing a second plurality of images, wherein each of the second plurality of images is captured at the fixed rate;

processing the second plurality of images to detect body parts of the first actor therein, wherein the detected body parts comprise a hand of the first actor;
providing a third set of clips of the second plurality of images as third inputs to a second machine learning model executed by the second camera, wherein each of the third set of clips comprises first portions of the second plurality of images captured over a predetermined duration, and
  wherein pixels of each of the first portions comprise:
    a first channel corresponding to a color red of a pixel;
    a second channel corresponding to a color green of the pixel;
    a third channel corresponding to a color blue of the pixel;
    a fourth channel indicating whether the pixel depicts a hand;
    a fifth channel indicating whether the pixel depicts an item; and
    a sixth channel indicating whether the pixel depicts a product space,
wherein each of the first portions depicts the first product space and at least one of the detected body parts of the first actor, wherein the second machine learning model is configured to generate spatial-temporal features of a clip of images with respect to an actor and a product space and to classify the clip of images as depicting at least one event at the product space or not depicting any event at the product space;
providing a fourth set of clips of the first plurality of images as fourth inputs to the first machine learning model, wherein each of the fourth set of clips comprises second portions of the first plurality of images captured over a predetermined duration, and
  wherein pixels of each of the first portions comprise:
    a first channel corresponding to a color red of a pixel;
    a second channel corresponding to a color green of the pixel;
    a third channel corresponding to a color blue of the pixel;
    a fourth channel indicating whether the pixel depicts a hand;
    a fifth channel indicating whether the pixel depicts an item; and
    a sixth channel indicating whether the pixel depicts a product space, and
wherein each of the second portions depicts the second product space and at least one of the detected body parts of the first actor;
determining that at least some of the third set of clips are classified as depicting at least one event based at least in part on third outputs received from the first machine learning model in response to the third inputs;
determining that at least some of the fourth set of clips are classified as depicting at least one event based at least in part on fourth outputs received from the first machine learning model in response to the fourth inputs;
transmitting a third sequence of spatial-temporal features to the computer system, wherein each of the third sequence of spatial-temporal features is generated for one of the at least some of the third set of clips; and
transmitting a fourth sequence of spatial-temporal features to the computer system, wherein each of the fourth sequence of spatial-temporal features is generated for one of the at least some of the fourth set of clips,
wherein at least the first sequence, the second sequence, the third sequence and the fourth sequence are provided to the transformer as the inputs.

19. The materials handling facility of claim 17, wherein the first method further comprises:
identifying portions of at least some of the first plurality of images depicting the at least one hand of the first actor;
determining at least one of:
  a first number of items depicted within the at least one hand in at least one of the first plurality of images; or
  a first identity of at least one item depicted within the at least one hand in at least one of the first plurality of images; and
transmitting information regarding the first number of items or the first identity to the computer system over the one or more networks, and
wherein the second method further comprises:
  determining a number of items or an identity of at least one item associated with the interaction based at least in part on the first number or the first identity,
  wherein the information regarding the at least one of the taking event or the return event comprises at least one of the number of items or the identity of the at least one item determined by the computer system.

20. The materials handling facility of claim 17, wherein the first machine learning model comprises a dual-model convolutional neural network backbone and a multi-level perceptron network, and
wherein the first machine learning model is configured to generate spatial-temporal features of a clip of images with respect to an actor and a product space and to classify the clip of images as being associated with a taking event, a return event or an event that is neither the taking event nor the return event.

21. A method comprising:
generating a clip of images, wherein each of the images of the clip was captured over a period of time and depicts a product space of a fixture;
generating a set of features from the clip of images, wherein each of the set of features corresponds to an actor and the product space;
classifying the clip of images in one of a plurality of classifications, wherein the plurality of classifications comprises:
  a first classification of a taking event;
  a second classification of a return event; and
  a third classification of no event;
generating a sequence of features comprising the set of features generated from the clip of images;
providing at least the sequence of features as an input to a machine learning model trained to generate a hypothesis regarding an event type, an actor and an event location based on features of images;
receiving an output from the machine learning model in response to the input; and
determining a hypothesis that the actor executed at least one of a taking event associated with the product space, a return event associated with the product space or no event associated with the product space based at least in part on the output.

* * * * *